United States Patent [19]

Horimai

[11] Patent Number: 5,623,478
[45] Date of Patent: Apr. 22, 1997

[54] APPARATUS FOR REPRODUCING AN OPTICAL RECORDING MEDIUM HAVING FIRST AND SECOND PIT STRINGS ON OPPOSITE SIDES OF EACH TRACK

[75] Inventor: Hideyoshi Horimai, Kanagawa, Japan

[73] Assignee: Sony Corporation, Tokyo, Japan

[21] Appl. No.: 658,464

[22] Filed: Jun. 5, 1996

Related U.S. Application Data

[62] Division of Ser. No. 280,181, Jul. 25, 1994, Pat. No. 5,563,872.

[30] Foreign Application Priority Data

Jul. 26, 1993 [JP] Japan ................................. 5-183986

[51] Int. Cl.$^6$ ....................................................... G11B 7/24
[52] U.S. Cl. ...................... 369/275.4; 369/58; 369/275.3
[58] Field of Search ............................. 369/275.4, 275.3, 369/275.2, 13, 58, 47, 48, 59

[56] References Cited

U.S. PATENT DOCUMENTS

| | | | |
|---|---|---|---|
| 4,674,081 | 6/1987 | Gerard et al. ............................. | 369/275 |
| 4,819,218 | 4/1989 | Barnard ..................................... | 369/50 |
| 4,858,221 | 8/1989 | Romeas ..................................... | 369/279 |
| 4,896,311 | 1/1990 | Ishihara ..................................... | 369/47 |
| 4,918,677 | 4/1990 | Ashinuma et al. ....................... | 369/32 |
| 4,991,163 | 2/1991 | Tokushuku et al. ..................... | 369/275.4 |
| 5,036,408 | 7/1991 | Leis et al. ................................. | 360/48 |
| 5,107,473 | 4/1992 | Fuji et al. ................................. | 369/32 |
| 5,124,967 | 6/1992 | Isaka et al. ............................... | 369/48 |
| 5,170,385 | 12/1992 | Senshu et al. ........................... | 369/48 |
| 5,172,357 | 12/1992 | Taguchi ..................................... | 369/48 |
| 5,179,547 | 1/1993 | Komaki et al. ........................... | 369/275.4 |
| 5,193,034 | 3/1993 | Tsuyoshi et al. ......................... | 360/51 |
| 5,199,023 | 3/1993 | Yamamoto et al. ...................... | 369/275.4 |
| 5,206,847 | 4/1993 | Kanda ....................................... | 369/44.13 |
| 5,214,629 | 5/1993 | Watanabe et al. ........................ | 369/44.26 |
| 5,233,590 | 8/1993 | Ogawa ....................................... | 369/48 |
| 5,237,554 | 8/1993 | Senshu et al. ........................... | 369/59 |
| 5,255,261 | 10/1993 | Iida et al. ................................. | 369/275.3 |
| 5,255,263 | 10/1993 | Van Uijen et al. ....................... | 369/275.3 |
| 5,278,814 | 1/1994 | Deguchi et al. .......................... | 369/47 |
| 5,283,776 | 2/1994 | Takagi ....................................... | 369/58 |
| 5,343,453 | 8/1994 | Ogino ........................................ | 369/44.28 |
| 5,363,352 | 11/1994 | Tobita et al. ............................. | 369/13 |
| 5,388,090 | 2/1995 | Hoshino et al. .......................... | 369/275.3 |
| 5,400,309 | 3/1995 | Satomura .................................. | 369/32 |
| 5,416,766 | 5/1995 | Horimai ..................................... | 369/116 |
| 5,418,768 | 5/1995 | Senshu ...................................... | 369/59 |
| 5,436,770 | 7/1995 | Muto et al. ............................... | 360/51 |
| 5,440,474 | 8/1995 | Hetzler ...................................... | 360/135 |
| 5,488,593 | 1/1996 | Furumiya et al. ........................ | 369/32 |
| 5,506,827 | 4/1996 | Tobita ........................................ | 369/59 |
| 5,517,485 | 5/1996 | Nishiuchi et al. ........................ | 369/275.3 |
| 5,524,103 | 6/1996 | Shimizu et al. .......................... | 369/59 |
| 5,539,724 | 7/1996 | Ohtomo ..................................... | 369/275.4 |

*Primary Examiner*—Tan Dinh
*Attorney, Agent, or Firm*—Limbach & Limbach L.L.P.

[57] ABSTRACT

There is provided an optical recording medium including a first pit string having a succession of pits and mirror surface sections, which first pit string is formed on one side of a track center as a reference, and a second pit string having pits and mirror sections, reversed in their array from the pits and the mirror surface sections of the first pit string. A laser beam is radiated onto the track center for accessing information signals represented by the pits and the mirror surface sections. There are also provided a recording device and a reproducing device for such optical recording medium.

9 Claims, 22 Drawing Sheets

APPARATUS FOR REPRODUCING AN OPTICAL RECORDING MEDIUM HAVING FIRST AND SECOND PIT STRINGS ON OPPOSITE SIDES OF EACH TRACK

This is a divisional of application Ser. No. 08/280,181, filed Jul. 25, 1994 now U.S. Pat. No. 5,563,872.

BACKGROUND OF THE INVENTION

This invention relates to an optical recording medium in which a data area is constituted by a pit string made up of pits formed along the track center scanned by a laser beam and lands (mirror surface sections) and in which the pit string in the data area is read with pre-set clocks so as to be reproduced as information signals, a method for reproducing data recorded on the optical recording medium, and a data recording device or laser cutting device employed for producing the optical recording medium.

An optical recording medium, such as one rotated at CAV (constant angular velocity), referred to herein as an optical disc, has a recording format, such as a recording format for a data area as shown in FIG. 21, in which pits P are formed along a track center Tc, with a pit width d of 0.5 μm and a pit length per clock of 0.86 μm and at a track pitch Tp of 1.6 μm along the disc radius, and are aligned in their positions along the track direction. The portions devoid of the pits are lands left as mirror surface regions.

For reproducing information signals from the optical disc having the above-mentioned recording format, the disc is rotated at CAV and a playback laser beam is radiated on the track center Tc for relative scanning with a laser spot BS.

The laser beam reflected from the optical disc is caused to fall on a light receiving element and converted into detected signals as electrical signals having a signal level corresponding to the reflected light volume. The detected signals are further demodulated by a signal demodulating circuit for producing playback information data.

The reflected light falling on the light receiving element after reflection by the mirror surface region is the light which has undergone substantially total reflection by the mirror surface. Thus the reflected light volume is abundant so that a detection signal having a high signal level is outputted from the light receiving element. On the other hand, the light volume of the reflected light modulated by the pit is lesser than that of the reflected light from the mirror surface region, so that a detection signal having a low signal level is outputted from the light receiving element.

In a downstream signal processor, detection signals outputted in series by the light receiving element are sampled with pre-set clock signals and thereby converted to bi-level data having a pulse amplitude corresponding to the signal level. The bi-level data is processed for decoding error-correction codes, such as parity codes or interleaving, for producing playback information data.

Since data corresponding to the pit P is a logical "1" and data corresponding to the mirror surface region is a logical "0", data having a long concatenation of "1"s or "0"s suffers from increased deviation in the dc balance. That is, the digital sum value (DSV) is offset to the (−) side or to the (+) side, thus producing an unstable state of the servo control system.

In addition, such data recording has a drawback that the data length is substantially increased, which is not meritorious in increasing the data recording density.

Another known recording method is shown in FIG. 22 in which recording is made so that the boundary between the pit P and the mirror surface region M is logically "1" and the pit P as well as the mirror surface region M other than the boundary is logically "0". Data reproduction is made in a similar manner, Such recording method is meritorious for increasing data recording density since it is unnecessary to increase the data length in distinction from the firstly stated system.

Consequently, the conventional practice has been to record pits on the optical disc after 8-bit data is converted to 14-bit data in accordance with the eight-to-fourteen modulation (EFM). Playback information data are produced after decoding EFM codes in addition to decoding of the error correction codes, as stated hereinabove.

However, the EFM system is not meritorious for high-density recording because it is 14-bit data converted from 8-bit data that is to be recorded. Although it is desirable to employ a direct data recording system for high density recording, the above-mentioned problem caused by increased dc balance offset is raised.

Besides, with the conventional optical disc, since the recording data are implemented by a bit string pattern consisting of mirror surface sections M and pits P formed on the track center Tc, the number of pits P and a range in which the pits P are formed differ from track to track depending on recording data. That is, the proportion between the number or size of the pits P and the number or size of the lands M in a data area per track is not equal and differs from track to track.

This leads to such a situation in the optical disc fabrication that, when a recording pattern on a stamper (a pit array pattern consisting of pits P and lands M) is to be transcribed onto a resin substrate by an injection molding method using the stamper, the flow rate of the molten resin into cavities is not uniform due to the differential density of the protrusions and recesses on the stamper resulting in fluctuations in the state of adhesion of the molten resin to the stamper. The result is that the contour of the pits P of the completed optical disc is locally deviated from the prescribed shape, while molding defects such as interruptions in the mirror surface sections M are produced.

Such molding defects are produced in particular in servo areas of the optical disc constructed in accordance with the sampled servo system. That is, the servo area is usually separated from the data area by a mirror area constituted solely by mirror surface sections M. Thus the mirror area is continuous along the radius of the optical disc. The result is that molten resin flows quickly through the mirror area towards the outer periphery of the cavity, so that a so-called ghost, that is broken edges of servo pits caused by the radially continuous mirror area, tends to be produced.

In addition, with the above-described sampled servo type optical disc, the following problem arises during tracking servo control during reproduction.

That is, the tracking servo control in the conventional sampled servo system is carried out using a pair of wobbled pits Pa and Pb pre-formed with a shift of one-fourth of a track pitch in opposite directions from the track center Tc, as shown in FIG. 23.

Specifically, the amount of reflected light when the laser beam spot BS traverses the wobbled pits Pa and Pb is sampled, and a tracking error signal is found based upon the difference between these signals. The spot BS is moved radially of the optical disc until the signal level, for example, of the tracking error signal becomes equal to zero, by way of performing tracking servo control.

On the other hand, the so-called track jump, which is the movement of the spot to a neighboring or other track, is performed by opening the tracking servo control loop, moving the spot to near a target track and subsequently closing the tracking servo control loop for capturing the spot BS to the target track.

During such track jump, that is when the laser beam spot BS scans the track obliquely, the tracking error signal in the sampled servo system is a sine wave signal, as shown in FIG. 24, such that it is not unequivocally set with respect to a displacement x of the beam spot BS from the track center.

It is when the spot BS is within a range 201, shown by hatched lines, that the tracking error signal is determined unequivocally with respect to the displacement x. That is, it is when the spot BS is within the range 201 that the spot BS can be captured without fail with respect to the track center Tc.

On the other hand, if the displacement x is larger and is outside the range 201, that is within the range 202, tracking servo control becomes unstable. Such unstable state tends to be produced when the laser beam spot BS is moved with an elevated speed along the radius of the optical disc as during the track jump.

There is produced an error in the distance the beam spot BS is moved during track jump with the tracking servo loop being turned off. If the tracking servo control loop is turned on outside the range 201, such as within the range 202, the possibility is high that the beam spot will be captured to a track other than the target track. In such case, a track jump needs to be performed a second time. Thus the conventional tracking servo has a drawback that the track jump cannot be preformed stably.

SUMMARY OF THE INVENTION

In view of the above-described status of the art, it is an object of the present invention to provide an optical recording medium in which, even if data includes a succession of continuous logical "1"s or "0"s, dc balance may be optimized, that is the DSV may be drawn closer to zero, without the necessity of performing modulation, such as EFM, which might otherwise produce increased data lengths, and in which stabilization in servo control and high density in the recording data may be achieved simultaneously.

It is another object of the present invention to provide an optical recording medium in which the proportion of the size of pits and that of the lands in the data area per track may be rendered equal to each other, so that, when transcribing a recording pattern (pit string pattern consisting of pits and lands) on the stamper onto the resin substrate by, for example, resin injection molding, the flow velocity of the molten resin into the stamper cavities may be rendered uniform for the cavities in their entirety, thereby eliminating the molding defects during fabrication of the optical recording media. It is a further object of the present invention to provide an optical recording medium in which the servo area may be detected easily when the optical recording medium is of the sampled servo type.

According to the present invention, there is provided an optical recording medium comprising a first pit string having a succession of pits and mirror surface sections and being formed on one side of a track center as a reference, and a second pit string having pits and mirror sections, logically inverted in their array from the pits and the mirror surface sections of the first pit string. The laser beam is radiated onto the track center for accessing information signals represented by the pits and the mirror surface sections.

DESCRIPTION OF THE PREFERRED EMBODIMENTS

Referring to FIGS. 1 to 20, preferred illustrative embodiments of the optical recording medium, as applied to a read-only optical disc of the sampled servo system, referred to herein as an optical disc, are explained in detail.

The optical disc is of the type run in rotated at a constant angular velocity (CAV) and has a recording format in which each track is divided into plural sectors each of which is made up of plural segments. Referring to FIGS. 1(a) to 1(c), each segment is made up of a 3-byte servo region Zs having servo pits and a 34-byte data region Zd for recording data per se. By the format constitution of the data region Zd, the segments are classified into three types of segments.

The first type segment is a data segment constituted by the three-byte servo region Zs followed by a recording data region 2d made up of a 1-byte clamp area Zc and a 33-byte recording data region Zw, as shown in FIG. 1(a). The second type segment is an address segment constituted by the three-byte servo region Zs followed by a data region Zd made up of a 1-byte clamp area Zc, a 14-byte address data area Za, a 2-byte automatic power control (APC) data and a 17-byte blank Zb, as shown in FIG. 1b. The third type segment is an address/data segment constituted by the three-byte servo region Zs followed by a data region Zd made up of a 1-byte clamp area Zc, a 14-byte address data area Za, a 2-byte APC data and a 17-byte data region Zw, as shown in FIG. 1c.

There are also three types of sectors, namely a 512-byte sector, a 1024-byte sector and a 2048-byte sector.

The 512-byte sector comprises a series array of a first segment string made up of the leading address/data segment followed by nine data segments and a second segment string made up of the leading address segment followed by the nine data segments, as shown in FIG. 2(a). The actual recording capacity of the recording data is 611 bytes, as shown by the following formula (1):

$$1 \text{ sector} = 9 \times 2 \text{ segments} \times 33 \text{ bytes} + 17 \times 1 \text{ bytes} = 611 \text{ bytes} \quad (1)$$

The 1024-byte sector comprises a series array of two of the above-mentioned first segment strings and two of the above-mentioned second segment strings, arranged in alternation with one another, as shown in FIG. 2(b). The actual recording capacity of the recording data is 1222 bytes, as shown by the following formula (2):

$$1 \text{ sector} = 9 \times 4 \text{ segments} \times 33 \text{ bytes} + 17 \times 2 \text{ bytes} = 1222 \text{ bytes} \quad (2)$$

The 2048-byte sector comprises a series array of four of the above-mentioned first segment strings and four of the above-mentioned second segment strings, arranged in alternation with one another, as shown in FIG. 2(c). The actual recording capacity of the recording data is 2444 bytes, as shown by the following formula (3):

$$1 \text{ sector} = 9 \times 8 \text{ segments} \times 33 \text{ bytes} + 17 \times 4 \text{ bytes} = 2444 \text{ bytes} \quad (3)$$

Figure 1:
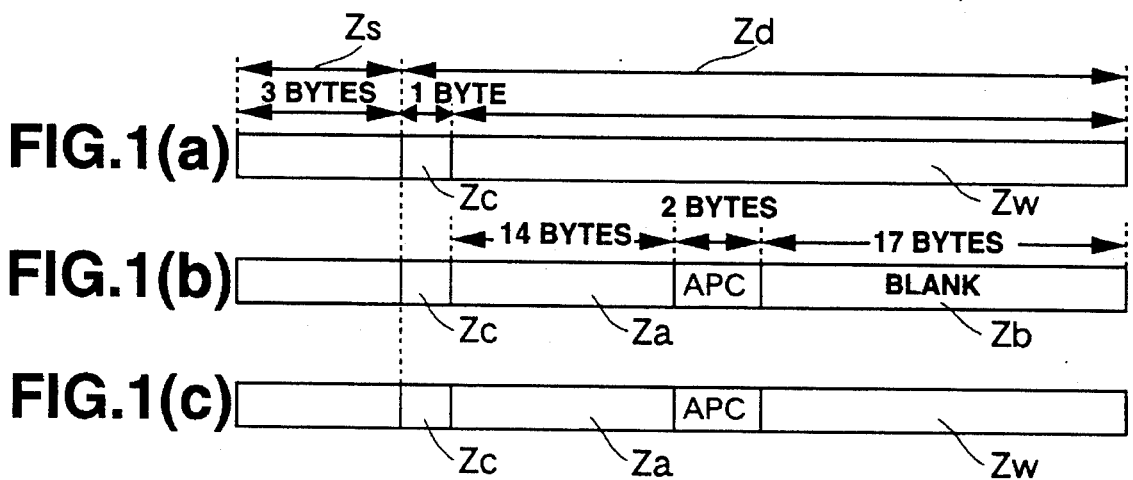
FIGS. 1(*a*), 1(*b*) and 1(*c*) are dramatic views illustrating a recording format of a sampled servo read-only optical recording disc according to a first embodiment of the present invention and particularly illustrating a data segment, an address segment and an address/data segment, respectively.
Figure 2:
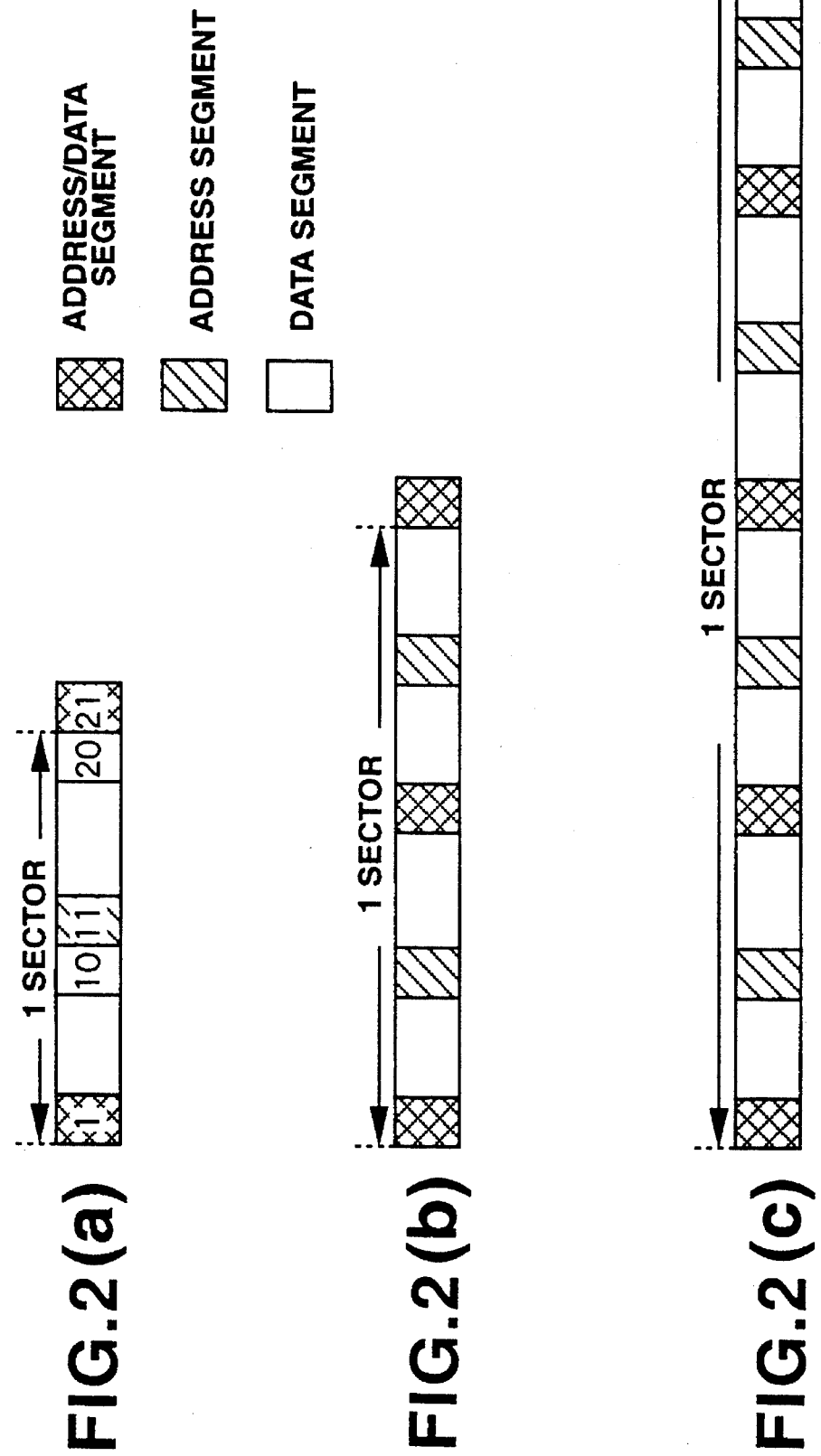
FIGS. 2(*a*), 2(*b*) and 2(*c*) are dramatic views for illustrating the types of sectors of the optical disc of the first embodiment, and in particular show a 512-byte sector, a 1024-byte sector and a 2048-byte sector, respectively.
Figure 3:
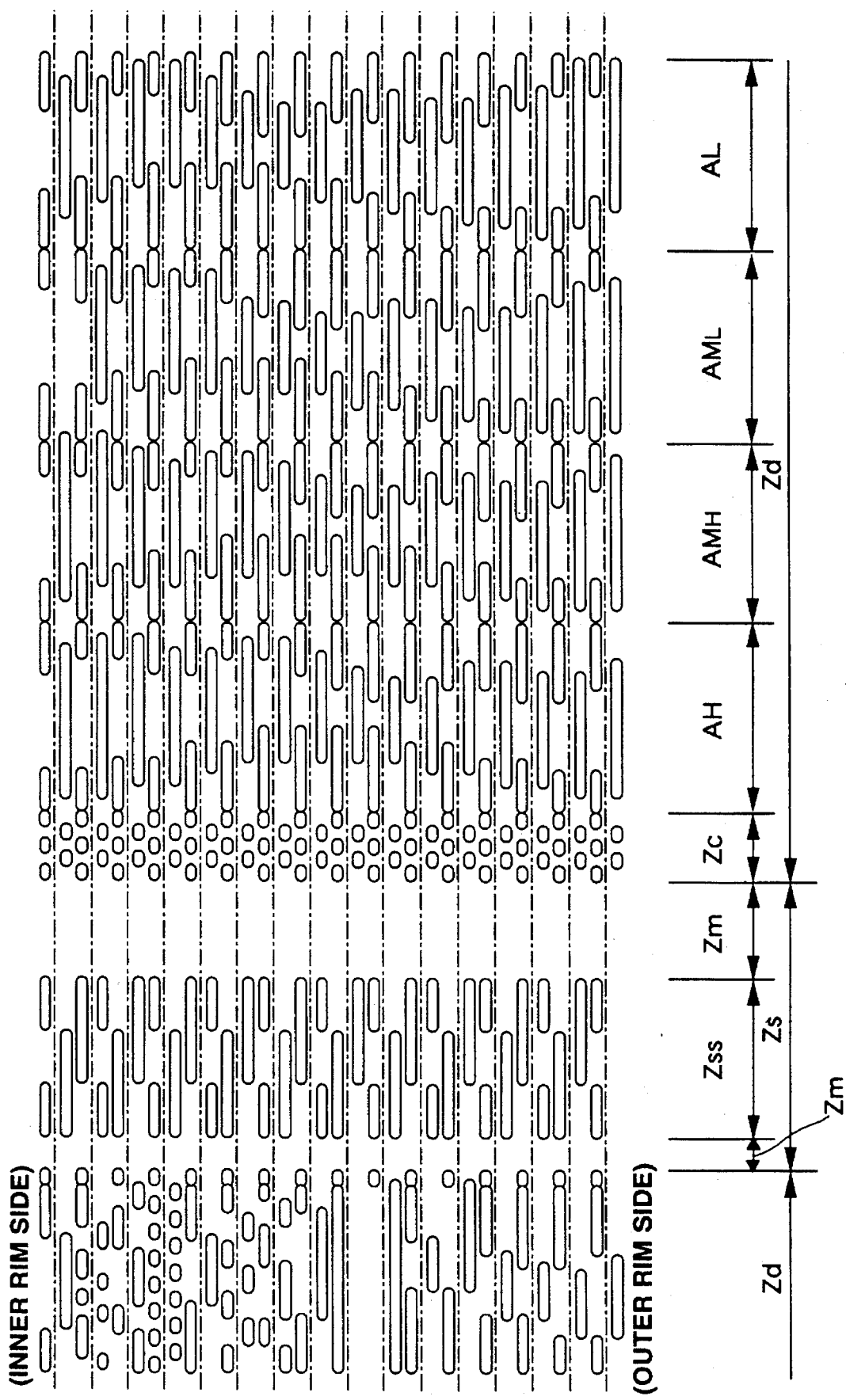
FIG. 3 schematically shows an example of a recording format in a servo area and a near-by data area in the optical disc of the first embodiment.

A first embodiment of the optical disc having the above-mentioned format constitution, above all, its recording format, is explained by referring to FIGS. 3 to 5. The recording format of the optical disc according to the first embodiment has the servo region Zs made up of a mirror area Zm constituted solely by a mirror surface and a servo area Zss constituted by an array of servo pits, with the servo area Zss being separated by the mirror area Zm from the data region Zd, as shown in FIGS. 3 and 4. That is, the servo region Zs is made up of the servo area Zss at a center and two mirror areas Zm on either sides of the servo area Zss.

Figures 5A, 5B, 5C:
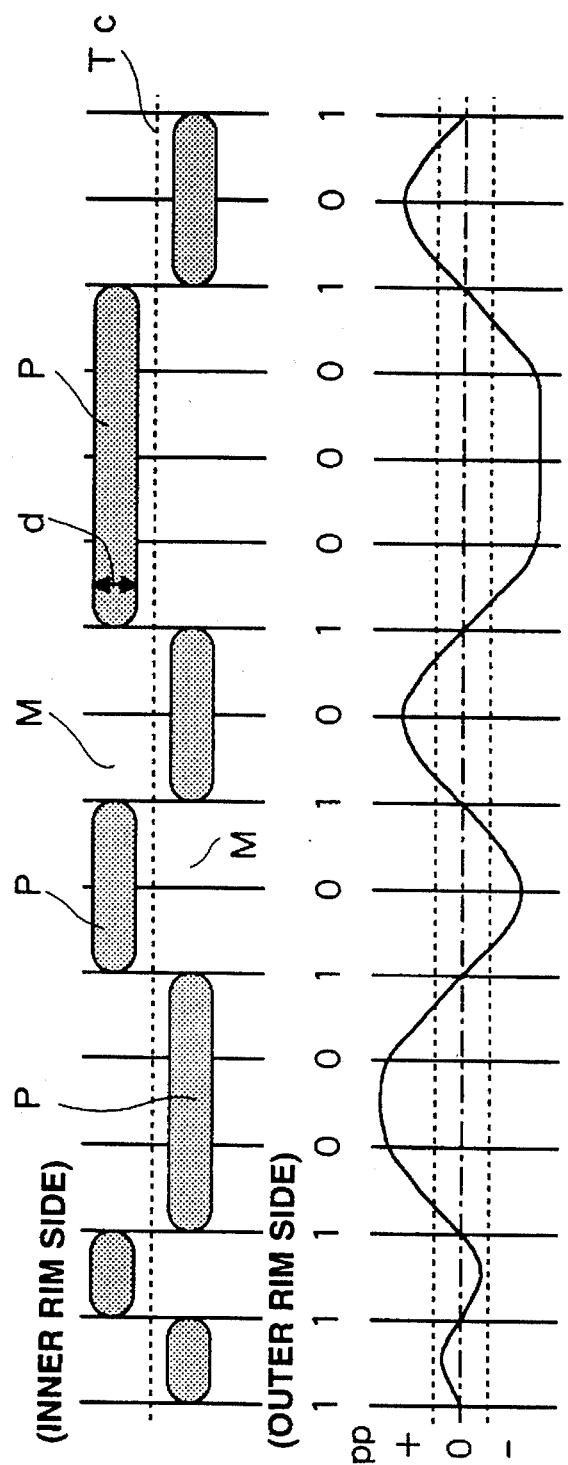
FIGS. 5(*a*), 5(*b*) and 5(*c*) shows essential portions, above all, data, of the optical disc according to the first embodiment, and in particular show an example of the recording format in the recording data section of the data region, a push-pull signal waveform produced on reproducing the data region and an RF signal waveform produced on reproducing the data region, respectively.

The recording format of the data region Zd, above all, the recording data area Zw, of the optical disc, is such that a pit string made up of pits P and lands (mirror surface sections) M formed on the radially inner peripheral side of the track center Tc, and an inverted pit string made up of the pits P and the lands M formed on the radially outer peripheral side of the track center Tc, with the second sequence of the pits and the lands being the inverse of the firstly mentioned pit string, as shown in FIG. 5(a). The effect is such that whereeever there is a P on the radially inner peripheral side of the track center $T_c$, there is a land M on the radially outer peripheral side of the track center $T_c$, and vice versa. One-track data is constituted by the pit string and the inverted pit string, arranged on either sides of the track center.

Specifically, if the diameter of the reproducing laser beam on the recording surface is set to 1.5 to 1.6 μm, similarly to that used for a conventional compact disc reproducing device, a number of pits P, each having a pit width d of 0.5 μm, are formed on the radially inner and outer peripheral sides of the track center Tc, as in the case of the conventional compact disc.

Figure 4A:
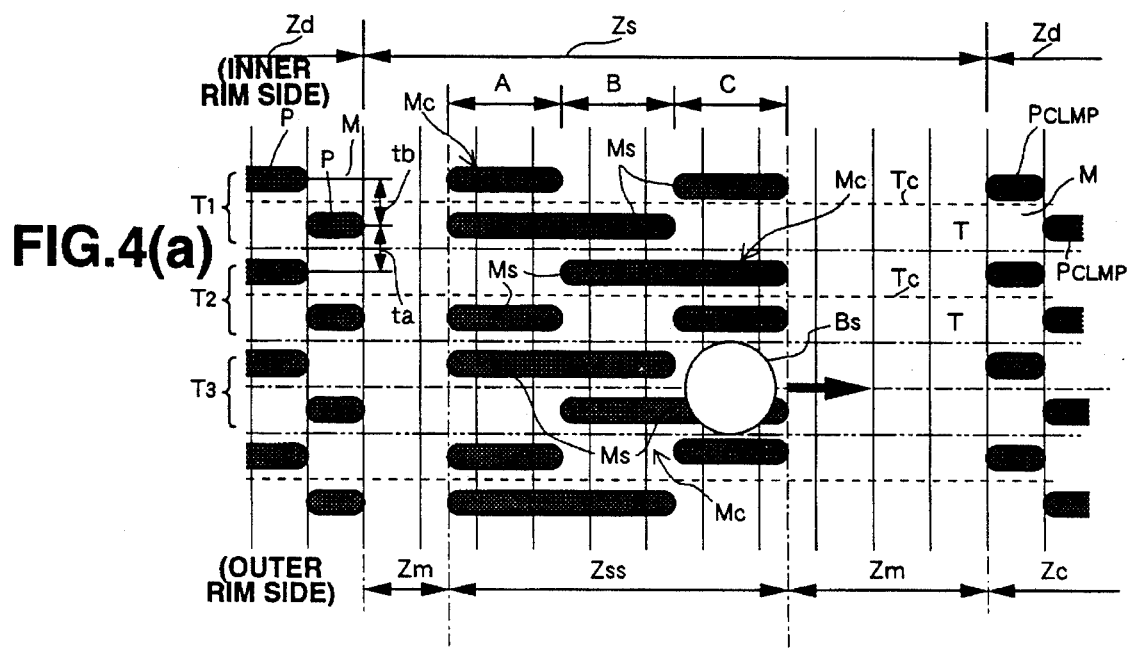
FIGS. 4(*a*), 4(*b*), 4*c*) and 4(*d*) show essential parts of the optical disc of the first embodiment, especially showing its servo region and its vicinity, wherein FIG. 4(*a*) schematically shows an example of a recording format for the servo area and its vicinity, FIG. 4(*b*) shows a push-pull signal waveform produced on reproducing the servo area and its vicinity, FIG. 4(*c*) shows an RF signal waveform produced on reproducing the servo area and its vicinity, and FIG. 4(*d*) shows waveforms of a mirror region detecting gating signal, a data area detecting gating signal, a servo area detecting gating signal, a clock detecting gating signal, an address data region detecting gating signal and clock pulses.

The distance between the track centers Tc, that is the track pitch, is selected to be 1.6 μm and, as shown in FIG. 4(a), the distance $t_a$ between the inner side pit string in the data region Zd of a given track, such as the first track $T_1$, and the outer side inverted pit string in the data region Zd of the neighboring track $T_a$, is selected to be equal to the distance $t_b$ between the inner side pit string and the outer side inverted pit string for the track $T_1$.

That is, with the optical disc of the present first embodiment, the inner side pit string is formed at a distance corresponding to one-fourth of a track pitch on the inner side of the track center Tc, while the outer side pit string is formed at a distance corresponding to one-fourth of the track pitch on the outer side of the track center Tc. That is, pit strings are arranged along the track direction at a pitch equal to one-half of the track pitch along the radius of the optical disc.

The spot BS of the playback laser beam scans the track center Tc, and is of such a size that both the inner side pits P and the outer side pits P are encompassed within the beam spot BS.

The relation of pit strings on the inner and outer sides of the track center Tc, as seen from the scanning spot BS, is such that, if there is the pit P on the inner side, it is faced by the land M on the outer side, whereas, if there is the land M on the inner side, it is faced by the pit P on the outer side.

Consequently, as long as the recording data area Zw of the data region Zd of the disc is scanned by the spot BS, there necessarily exists one of the pits within the beam spot BS.

For reproducing the optical disc of the present first embodiment, clock signals are generated during reproduction from a clock mark Mc formed in the servo area Zss of the servo region Zs, as later explained, and the pit string and the inverted pit string of the data region Zd are reproduced based upon output timings of the generated clock signals. In FIGS. 4(a) and 5(a), vertical ruled lines schematically indicate the output timings of the clock signals.

It is thus seen that the leading and trailing ends of the pits P in both the pit string and the inverted pit string in the recording data area Zw are formed in synchronism with the output timings of the clock signals, as shown in FIG. 5(a). On the other hand, the logical data reproduced from the pit string has a constitution in which the boundary between the pit P and the land M, that is the above-mentioned leading or trailing end, is logically "1", while the portions of the pit P and the lands M other than the boundary are logically "0".

The servo area Zss in the servo region Zs is sandwiched between mirror areas (lands) Zm formed on either sides of the track, as shown in FIG. 4(a). The leading end of the servo area Zss is arranged at a position displaced 1.5 clocks from the trailing end of the data region Zd, while the trailing end of the servo area Zss is arranged at a position displaced 3.5 clocks from the leading end of the data region Zd.

That is, the data region Zd and the servo area Zss are spaced apart from each other by the mirror area corresponding to 1.5 clocks, that is an integer and a fractional number of clocks, instead of an integer number of clocks, thereby enabling the distinction to be made between the data region Zd and the servo region Zs.

Besides, the same arraying pattern of the pits (servo pits) P constituting the servo area Zss is repeated at an interval of three tracks. Specifically, if the servo area Zss is divided at an interval of two clocks into three zones, beginning from the leading end, with the first, second and third zones being termed regions A, B and C, as shown in FIG. 4(a), the combinations of pit arrays contained in the three zones are of three different patterns.

In the illustrated example, pits P are formed in the zones A and C on the inner side of the first track $T_1$, while a sole pit P is formed on the outer side thereof across the zones A and B. That is, the pits P are formed on both the inner and outer sides of the zone A, whereas the pits P are formed on the outer side of the zone B and on the inner side of the zone C. With the first track $T_1$, the pits in the zone A are used as clock marks Mc for clock detection, while the pits P in the zones B and C are used as a servo mark Ms for tracking error detection.

On the other hand, a pit P is formed across the zones B and C on the inner side of the second track $T_2$, while pits P are formed on the outer side thereof in the zones A and C. That is, the pits P are formed on both the inner and outer sides of the zone C, whereas the pits P are formed on the outer side of the zone A and on the inner side of the zone B. With the second track $T_2$, the pits in the zone C are used as clock marks Mc for clock detection, while the pits P in the zones A and B are used as a servo mark Ms for tracking error detection.

On the other hand, a pit P is formed across the zones A and B on the inner side of the third track $T_3$, while a sole pit P is formed on the outer side thereof in the zones A and C. That is, the pits P are formed across the inner side and the outerside of zone B, whereas the pits P are formed on the inner side of the zone A and on the outer side of the zone C. With the third track $T_3$, the pits P in the zone B are used as clock marks Mc for clock detection, while the pits P in the zones A and C are used as a servo mark Ms for tracking error detection.

The method for tracking servo control by the above-described pit array of the servo region Zs will be explained in detail subsequently.

Figure 6:
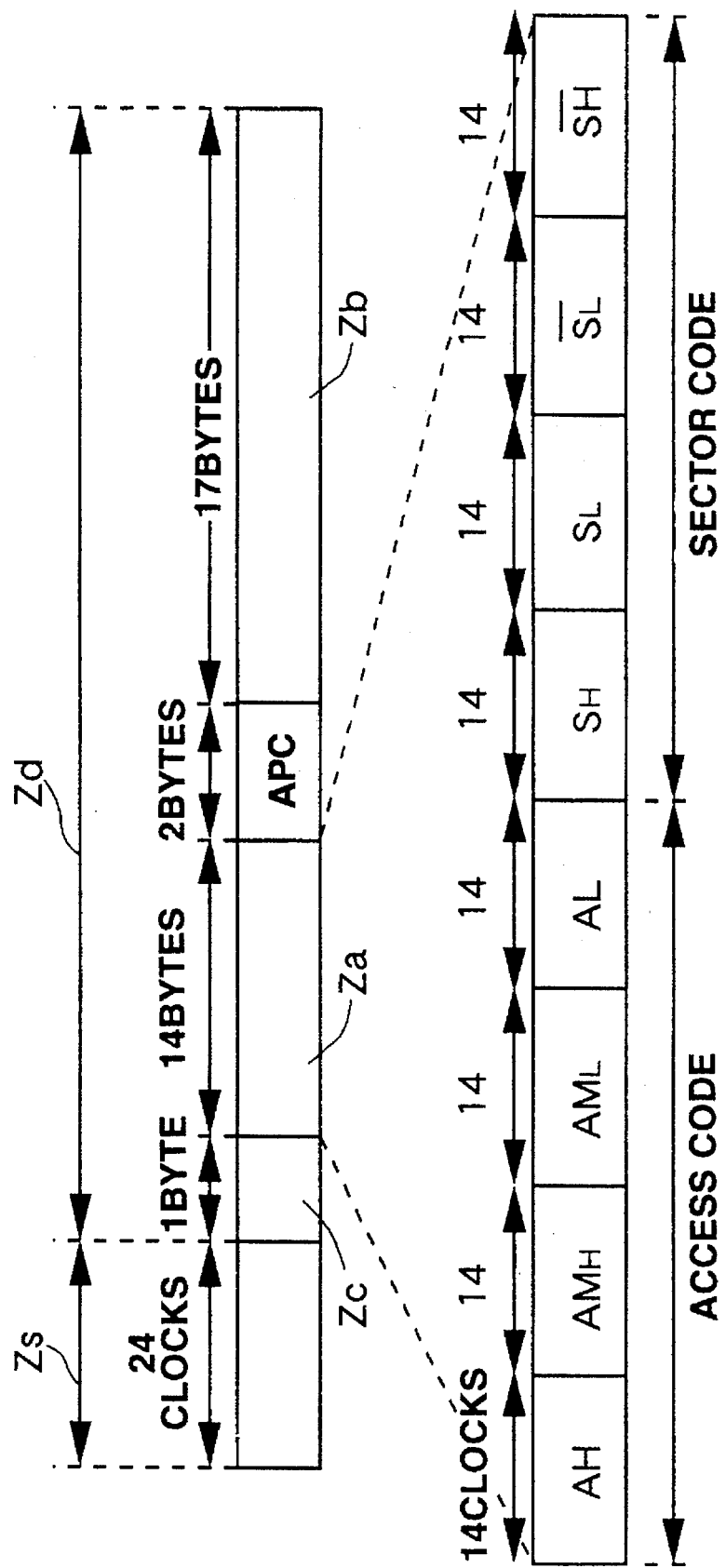
FIG. 6 is a diagrammatic view illustrating bit allocation to address data in an address data section in an address segment in the optical disc according to the first embodiment.

The recording format of the data region Zd, especially that of the address segment or the address/data segment, of the optical disc of the first embodiment, comprises a recorded series array of an access code and a sector code, each representing the Gray code by a pit string and an inverted pit string, as shown in FIGS. 3 and 6. In FIG. 3, only the access code is shown.

Taking an example of the address segment, the access code is made up of an upper order address area (AH, $AM_H$) indicating an upper order address of the track address and a lower order address area ($AM_L$, AL) indicating the lower order address thereof, with the upper address area being divided into two address areas AH and $AM_H$ and with the lower address area being divided into two address areas $AM_L$ and AL, as shown in FIG. 6. Each of the address areas AH, $AM_H$, $AM_L$ and AL is formed by four bits and allocated to a 14-clock area based upon output timings of the clock signals. With each of the address areas AH, $AM_H$, $AM_L$ and AL, the Gray code is represented by the pit array formed at the central 12-clock area, as shown in FIG. 7.

A sector code is made up of an upper address area $S_H$ and a lower address area $S_L$, indicating the upper order and lower order addresses of the sector address, and inverted address areas $\overline{S}_L$ and $\overline{S}_H$ inverted from these data. Similarly to the access code, the sector code has an address area arranged to represent the Gray code by the pit array formed in a central 12-clock area.

Figure 7:
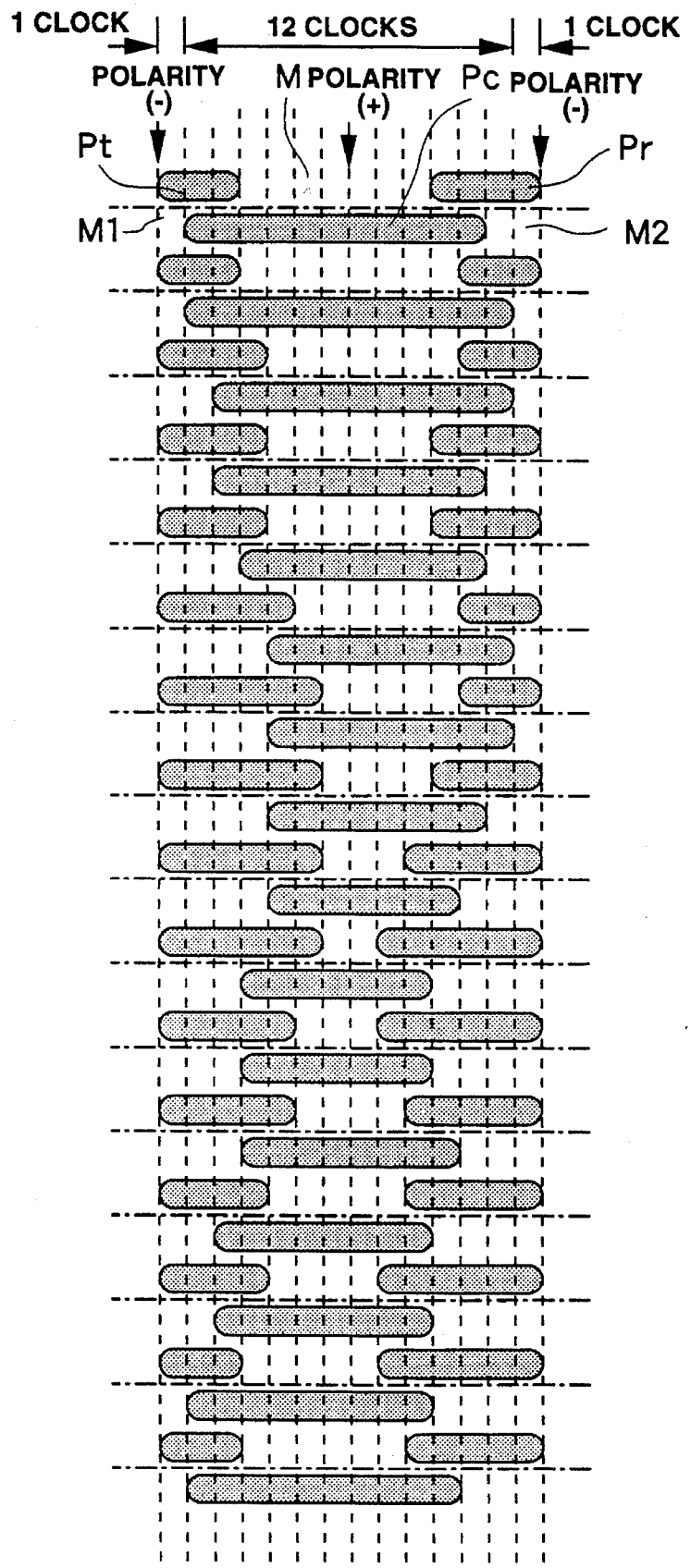
FIG. 7 is a schematic view showing the contents of the gray code represented by pits formed in an address data section in an address segment in the optical disc according to the first embodiment.

Turning to the pit string representing the Gray code, the inner peripheral side pit string is constituted by a leading pit Pt and a trailing end pit Pr, each having a pit length corresponding to the relevant Gray code, and a land M having a length corresponding to the relevant Gray code, while the outer peripheral side inverted pit string is constituted by a leading end land M1 and a trailing end land M2, each having a pit length corresponding to the relevant Gray code, and a central pit P having a length corresponding to the relevant Gray code, as shown in FIG. 7.

The leading end pit Pt and the trailing end pit Pr in the inner peripheral side pit string are overlapped by two clocks with the central pit Pc in the outer peripheral side inverted pit string, such that the Gray code recorded in each address areas AH, $AM_H$, $AM_L$, AL, $\overline{S}_H$ and $\overline{S}_L$ may be read by detecting the overlapped portions by the playback laser beam.

In the above pit string, it is the pit string portion and the inverted pit string portion corresponding to the central 12 clocks that are read as the Gray code. The 1-clock pits on either ends play the part of negative polarity marks used for rendering the push-pull signal into negative polarity signal.

The clamp area Zc comprises a staggered array of clamp pits $P_{CLMP}$, each having a pit length corresponding to one clock, as shown in FIGS. 3 and 4(a). In the outer peripheral side pit string, three lands M, each having one-clock length, are arrayed with the clamp pits $P_{CLMP}$ in-between, whereas, in the inner peripheral side pit string, three clamp pits $P_{CLMP}$ are arrayed with the lands M, each having a length corresponding to one clock, in-between.

The clamp operation by the pit array of the clamp area Zc is explained subsequently.

Figure 8:
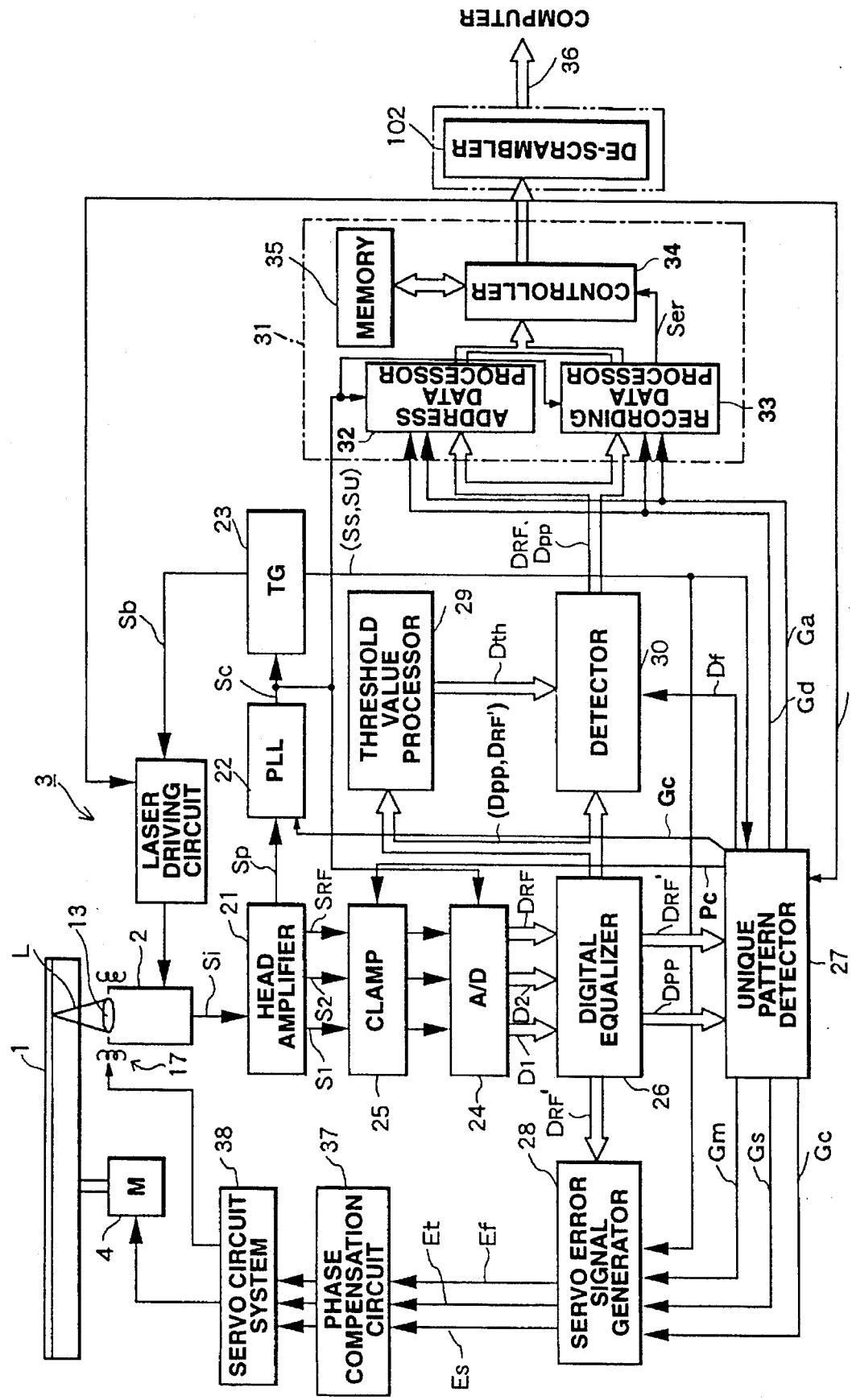
FIG. 8 is a block diagram showing an arrangement of a playback system of a disc reproducing device according to an embodiment of the present invention.

The reproducing method for reproducing information signals from the above-described optical disc is now explained by referring to the reproducing system of the reproducing device shown in FIG. 8.

The reproducing system of the disc reproducing device is made up of an optical pickup 2 for radiating a laser beam L on an optical disc 1 of the first embodiment and detecting the volume of light reflected from the recording surface, and a signal processor 3 for reproducing data from the playback signals from the optical pickup 2.

Figure 9:
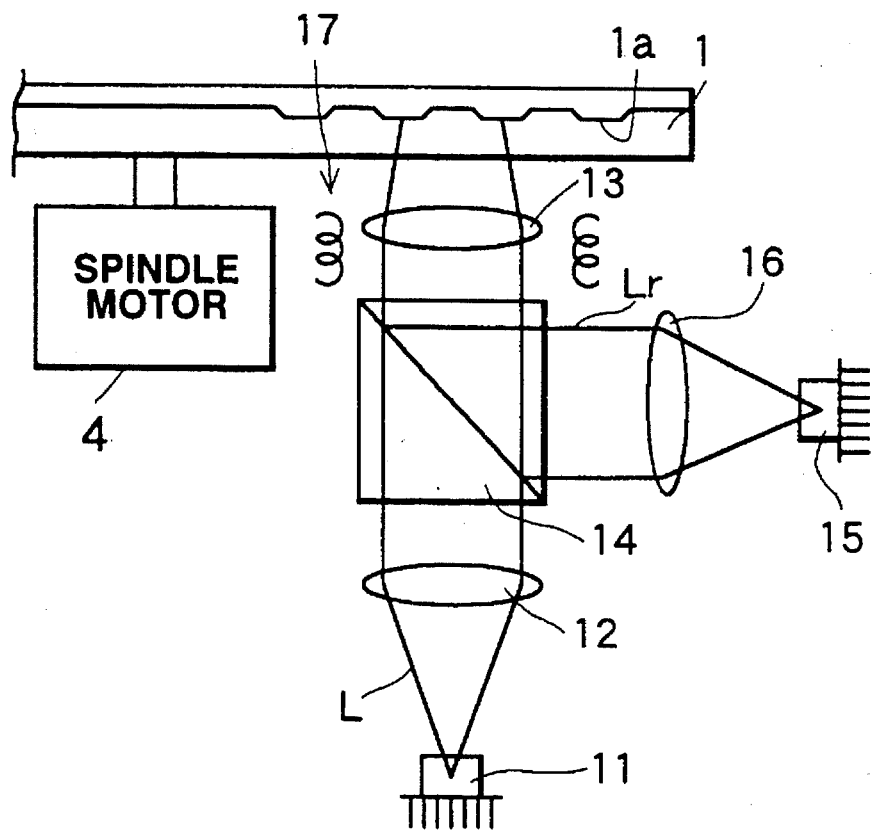
FIG. 9 shows an arrangement of an optical pickup in the playback system of a disc reproducing device according to an embodiment of the present invention.

The optical pickup 2 is arranged on the same side of the optical disc 1 as a spindle motor 4 rotationally driving the optical disc 1 and is substantially of the same construction as the conventional optical pickup employed in a compact disc reproducing device, as shown in FIG. 9. That is, the optical pickup 2 includes a laser light source 11, a collimator lens 12 for collimating the light outgoing from the laser light source 11 into a parallel beam, and an objective lens 13 condensing the collimated light from the collimator lens 12 for radiating the condensed light on the recording surface 1a of the optical disc 1. The optical pickup 2 also comprises a beam splitter 14 arranged on an optical path between the collimator lens 12 and the objective lens 13 for splitting the light reflected from the recording surface 1a of the optical disc 1, and a photodetector 15 for detecting the light volume of the reflected light Lr split by the beam splitter 14. The optical pickup unit finally includes a converging lens 16 arranged on an optical path between the beam splitter 14 and the photodetector 15 for converging the reflected by the beam splitter 14.

The objective lens 13 is slightly moved by a two-dimensional actuator 17 in a direction towards and away from the optical disc 1 and in the radial direction of the optical disc 1. The two-dimensional actuator 17 has a magnetic circuit comprising a focusing coil, a tracking coil and a magnet, all not shown.

The optical pickup 2 is tracking servo controlled so that the track center Tc of the optical disc 1 is scanned by the center of the spot BS of the laser beam L radiated from the laser light source 11.

The laser light source 11 of the optical pickup 2 comprises a semiconductor laser radiating the laser light beam L having the same wavelength as that radiated by the conventional optical pickup. The collimator lens 12 collimates the laser beam L from the laser light source into a parallel beam which is caused to be incident on the beam splitter 14.

The beam splitter 14 comprises a half mirror for transmitting the outgoing light L from the laser light source 11 through the objective lens 13. The objective lens 13 has a numerical aperture NA equivalent to that of the conventional optical pickup and converges the outgoing light L from the laser light source 11 transmitted through the beam splitter 14 in order to radiate it on the recording surface 1a of the optical disc 1.

On the recording surface 1a of the optical disc 1, as shown in FIGS. 4a and 5a are arrayed a data region Zd and a servo region Zs, made up of the servo area Zss and the land Zm, in spatial separation from the data region Zd. Above all, in the data region Zd, a pit string corresponding to the recording data is formed on the inner peripheral side of the data region Zd, and a corresponding inverted pit string is formed on the outer peripheral side thereof relative to the track center Tc.

Figure 10A:
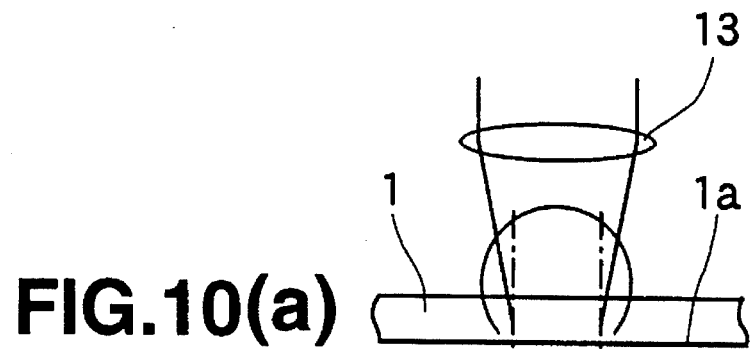
FIGS. 10(*a*) to (*d*) show the intensity distribution of the reflected light on radiation of a laser beam to the optical disc according to the first embodiment.
Figure 10B:
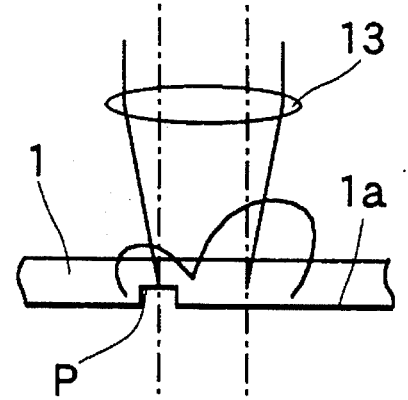

Consequently, the reflected light Lr, reflected by the land Zm constituted solely by the mirror surface, has a light intensity distribution which becomes transversely symmetrical on the drawing sheet, as shown in FIG. 10a. If there exists in the data region Zd the pit P on the inner peripheral side, while there lacks the pit P on the outer peripheral side, the reflected light Lr has such light intensity distribution that, due to the diffraction by the pit P on the inner peripheral side, the reflected light deflected towards the right on the drawing sheet becomes predominant, as shown in FIG. 10b.

Figure 10C:
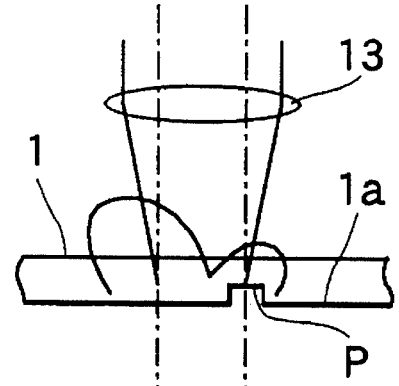
Figure 10D:
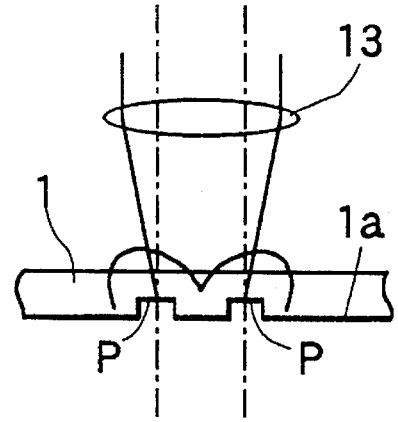

Conversely, if there is the pit P on the outer peripheral side of the data region Zd, while there is no pit P on the inner peripheral side, the reflected light distribution is deflected towards the left more strongly on the drawing sheet, as shown in FIG. 10c. If there exist pits P on both the inner and outer peripheral sides of the servo area Zss of the servo region Zs, the reflected light Lr has a light intensity distribution which is transversely symmetrical on the drawing sheet, due to the diffraction by both of the side pits P, as shown in FIG. 10d). However, the reflected light intensity becomes lower than when there is no pit P.

The reflected light Lr, having the light intensity distribution which depends upon the presence or absence of the pits P, is collimated by the objective lens 13 into a parallel beam which is again caused to fall on the beam splitter 14 whereby part of the reflected light Lr is split by reflection.

The converging lens 16 is constituted by a cylindrical lens for producing a focusing error signal by, for example, the astigmatic method. By the converging lens 16, the reflected light Lr is converged on the light receiving surface of the photodetector 15.

Figure 11:
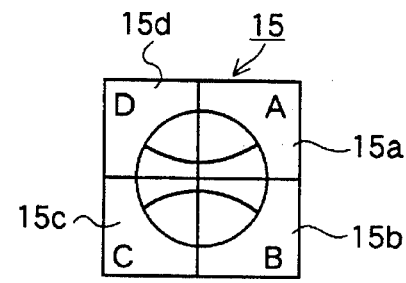
FIG. 11 is a diagrammatic view showing the plan configuration of a light-receiving surface of a photodetector in the optical pickup shown in FIG. 9.

The photodetector 15 has its light receiving region divided into four sections 15a, 15b, 15c and 15d, as shown in FIG. 11. The photodetector 15 has a far-field pattern on the light receiving surface in which, if there is no pit P on the inner peripheral side of the track center Tc and there is the pit P on the outer peripheral side thereof, the sections 15a and 15d become lighter, while the sections 15b and 15c become darker due to light diffraction at the pit P, as indicated by hatched lines in FIG. 12a.

Figures 12A, 12B, 12C, 12D:
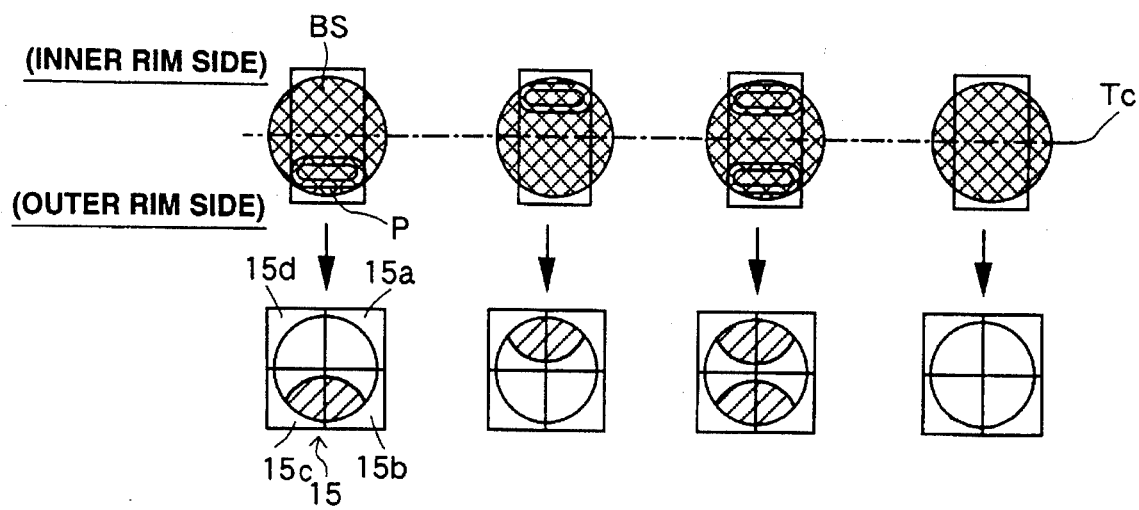
FIGS. 12(*a*) through 12(*d*) show a far-field pattern of the reflected light on the light-receiving surface of the photodetector.

Conversely, if there is the pit P on the inner peripheral side and there is no pit P on the outer peripheral side, as shown in FIG. 12b, the sections 15a, 15d become darker, while the sections 15b, 15c become lighter. If there exist the pits P on both the inner and outer peripheries, as shown in FIG. 12c, all of the sections 15a to 15d become darker. If there exist no pits P on the inner or the outer peripheries, as shown in FIG. 12d, all of the sections 15a to 15d become lighter.

Consequently, there are three signal levels, that is a high level (H), a mid level (M) and a low level (L), as the signal levels of the RF signal obtained by summing the detection signals, produced by photo-electric conversion by the four regions 15a to 15d, in association with three cases in which there are no pits P on the inner or outer peripheries (FIGS. 10a and 12d), there exists one pit P on the inner or outer peripheral side (FIGS. 10b, 10c and 12a, 12b) and there exist pits P on both the inner and outer peripheries (FIGS. 10d and 12c).

The signal processor 3 comprises a head amplifier 21 to which a detection signal Si from the photodetector 15 enters and which performs pre-set signal waveshaping based upon the input detection signal Si. The head amplifier 21 has plural differential amplifiers built therein and outputs four kinds of output signals. The first output signal S1 is a sum signal of detection signals produced by photo-electric conversion by the sections 15a, 15d of the photodetector 15 on which fall the reflected lights reflected by the inner peripheral sections of the track relative to the track center Tc. The second output signal S1 is a sum signal of detection signals produced by photo-electric conversion by the sections 15b, 15c of the photodetector 15 on which fall the reflected lights reflected by the outer peripheral sections of the track relative to the track center Tc.

The third output signal is a sum signal of detection signals produced by photo-electric conversion by the four sections 15a to 15d of the photodetector 15, that is an RF signal SRF. The fourth output signal is a pulse signal Sp outputted by a bottom detection circuit, not shown, which is built into the head amplifier 21. The pulse signal Sp, produced by the bottom detection circuit, is a signal which rises at an output timing of the lowermost level signal detected by the bottom detection circuit from the RF signal.

The reason the lowermost level signal among the input RF signals SRF is detected by the bottom detection circuit is that, as described previously, the constructive pattern of the clock mark Mc in the servo area Zss is such pattern in which there exist pits P on both the inner and outer peripheries with respect to the track center Tc and, if this portion is scanned by the beam spot BS, the reflected light Lr becomes weakest in light intensity due to light diffraction by the inner and outer peripheral pits P, with the signal waveform of the RF signal SRF produced at this time being of the lowest signal level. Consequently, generation of the pulse signal Sp which rises at the stage the lowest level signal SRF is supplied is equivalent to detection of the clock mark Mc.

The pulse signal Sp is routed to a next stage PLL circuit 22. The PLL circuit 22 generates a clock signal Sc, which gives the playback timing, based upon the pulse signal Sp from the head amplifier 21 and a clock detection gate signal Gc from a unique pattern detection circuit 26 as later explained. The clock signal Sc from the PLL circuit 22 is supplied to a next stage timing generator (TG) 23 and to an A/D converter 24 as later explained.

The timing generator 23 generates plural kinds of timing signals, as required by various circuits, based upon the clock signals Sc supplied by the PLL circuit 22. In the present embodiment, these timing signals are a reference signal Sb supplied to a laser driving circuit 18, as required for laser excitation of the laser light source 11 in the optical pickup 2, a servo clock signal Ss as required for servo control and rotation control of the optical disc 1 and a reference clock Su for detecting pre-set unique patterns, herein the patterns of the mirror area Zm, data region Zd, servo region Zs, clock mark Mc and the address data area Za.

The servo clock signal Ss and the reference clock signal Su are of the same type of signals and represent double signals having a period one-half the period of the clock signal Sc outputted by the PLL circuit 22 and are supplied to the unique pattern detector 27.

The signal processor 3 includes a clamp circuit 25 downstream of the head amplifier 21. The clamp circuit 25 clamps the levels of the first output signal $S_1$, second output signal $S_2$ and the RF signal $S_{RF}$ at the reference levels and eliminates noise components caused by fluctuations in reflectance of the playback laser beam based upon the input of the clamp pulse Pc from the unique pattern detection circuit 27 as later explained. Since the clamp area Zc in the recording format is allocated immediately after the servo region Zs in each segment, as shown in FIGS. 3 and 6, the clamp operation is performed on the segment basis. The clamp area may be detected by forming pits necessarily on the inner peripheral side right after the mirror area Zm.

The signal processor 3 also includes the e.g. 8-bit A/D converter 24 for converting the first and second output signals $S_1$, $S_2$ and the RF signals $S_{RF}$ entering the A/D converter via the clamp circuit 25, based upon the output timings of the clock signals Sc from the PLL circuit 22, and a digital equalizer 26 for equalizing the digital signals $D_1$, $D_2$ and $D_{RF}$ from the A/D converter 24 by, for example, a 3-tap digital filter.

The digital equalizer 26 optimizes the input digital signals $D_1$, $D_2$ and $D_{RF}$, depending on the respective densities, as the equalization coefficients, for providing the optimum error rates, in order to produce optimized digital signals $D_1'$, $D_2'$ and $D_{RF}'$, and calculates the difference between the digital signals $D_1'$ and $D_2'$ associated with the first and second output signals $S_1$ and $S_2$ in order to produce a push-pull signal $D_{pp}$.

Figure 4B:
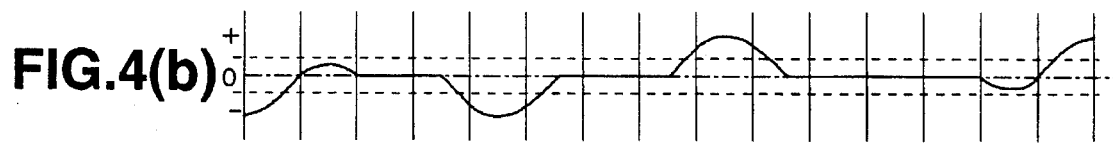
Figure 4C:
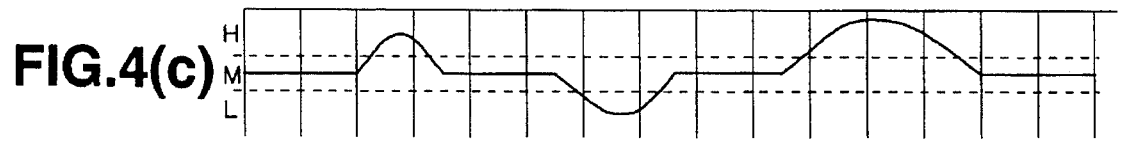

The signal waveforms of the push-pull signal Dpp prepared by the digital equalizer 26 and the RF signal $S_{RF}$ from the head amplifier 21 are shown in FIGS. 4b, 4c and in FIGS. 5b, 5c, respectively. Although the push-pull signal Dpp is formulated in the present embodiment as digital signals, it is described herein as an analog signal for facilitating waveform comparison with the analog RF signal $S_{RF}$.

The push-pull signal waveform and the RF signal waveform, shown in FIGS. 5b add 5c, are waveforms obtained on reproducing the pit string and the inverted pit string of the recording data area Zw in the data region Zd shown in FIG. 5a. Referring to FIG. 5, since there necessarily exists the mirror surface M on the outer peripheral side in the recording data area Zw with respect to the track center Tc, if there exists the pit P on the inner peripheral side, whereas, if the inner peripheral side is the mirror surface M, there exists the pit P on the outer peripheral side, so that the signal level of the RF signal $S_{RF}$ is the mid level (M).

On the other hand, the push-pull signal Dpp is of a signal waveform which becomes zero at a boundary between the pit P and the mirror surface M in the pit string or in the inverted pit string and which is deviated in the (−) direction and in the (+) direction when there is the pit P in the inner peripheral side and in the outer peripheral side, respectively.

The push-pull signal waveform and the RF signal waveform, shown in FIGS. 4b and 4c, are the waveforms obtained on reproducing the pit string and the inverted pit string in the servo region Zs and the near-by region and, above all, the playback waveforms obtained on scanning the third track $T_3$ by the beam spot BS. It is seen from these figures that, since the mirror area Zm is constituted solely by the mirror surface M, and there exists no pit P on the inner or outer peripheral side of the track center Tc, the RF signal $S_{RF}$ for the mirror area Zm has a high signal level (H).

In the portion of the servo area Zss where there is the servo mark Ms, since there is the pit P on the inner or outer peripheral side, the signal level of the RF signal $S_{RF}$ for the servo mark Ms is the mid level (M). In the portion of the servo area Zss where there is the clock mark Mc, since there exist the pits P on the inner and the outer peripheral sides, the signal level of the RF signal $S_{RF}$ for the clock mark Mc is the low level (L).

On the other hand, the push-pull signal Dpp is of a signal waveform which becomes zero at the portions of the track registering with the mirror area Zm and the clock mark Mc and which is deviated in the (−) direction and in the (+) direction at the portions of the servo area Zss registering with the servo mark Ms if there is the pit P in the inner peripheral side and in the outer peripheral side, respectively.

Downstream of the digital equalizer 26 are connected the above-mentioned unique pattern detection circuit 27, a servo error signal generator 28, a threshold value calculating circuit 29 and a partial response PR (1, 1) detection circuit 30.

The push-pull signal Dpp and the digital RF signal $D_{RF}$ from the digital equalizer 26 enter the unique pattern detection circuit 27 which, based upon the push-pull signal Dpp, digital RF signal $D_{RF}$ and the reference clock signal Su from the timing generator 23, formulate and output five different kinds of unique pattern detection signals Gm, Gd, Gs, Gc and Ga and the clamp pulse Pc.

Figure 4D:
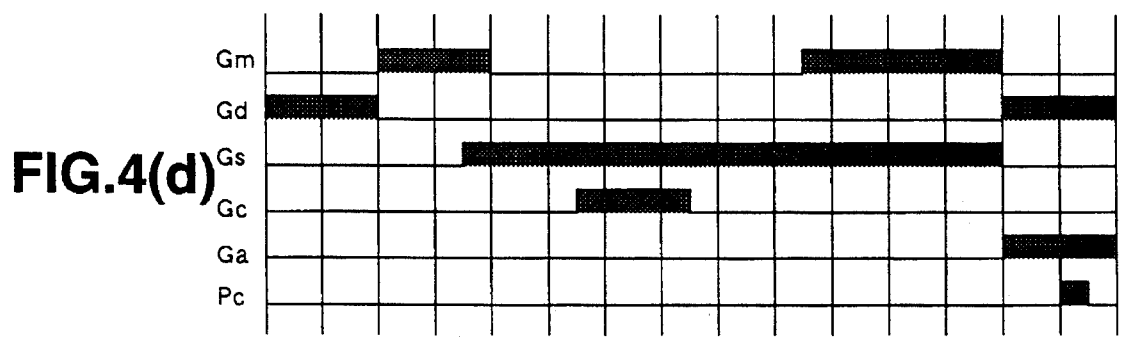

If assumed that the third track $T_3$ is scanned by the beam spot BS of the playback laser beam, the unique pattern detection gate signal, which is generated at the unique pattern detection circuit 27 is made up of a mirror area detecting gating signal Gm, which goes high only for the portion of the track registering with the mirror area Zm, a data region detecting gating signal Gd which goes high only for the portion of the track registering with the data region Zd, a servo region detecting gating signal Gs which goes high only for the portion of the track registering with the servo region Zs, a clock detecting gating signal Gc which goes high only for the portion of the servo region Zs of the track registering with the clock mark Mc and an address data detecting gating signal Ga which goes high only for the portion of the data region Zd of the track registering with the address data area Za, as shown in FIG. 4d.

These detection gate signals Gm, Gd, Gs, Gc and Ga are prepared by the unique pattern detection circuit 27 in the following manner. That is, the unique pattern detection circuit 27 first detects the clock mark hlc in the servo area Zss of the servo region Zs and, based upon the detection of the clock mark Mc, formulates the clock detecting gating signals Gc, which then is outputted to the PLL circuit 22. The PLL circuit 22 formulates and outputs reference clock signals for the system operation based upon the input clock detecting gating signal Gc and the pulse signal Sp indicating the clock mark Mc from the head amplifier 21. The clock signal Sc is converted in the timing generator 23 to the reference clock signal Su (and Ss) which is routed to the unique pattern detection circuit 27.

Based upon the above-mentioned servo region detecting gating signal Gs and the reference clock signal Su from the timing generator 23, the unique pattern detection circuit 27 formulates the remaining components of the unique pattern detecting gating signal, namely the mirror area detecting gating signal Gm, data region detecting gating signal Gd and the address data area detecting gating signal Ga. The data region detecting gating signal Gd is produced for all of the segments, whereas the address data area detecting gating signal Ga is produced only for the address and address/data segments.

Of these detection gate signals Gm, Gd, Gs, Gc and Ga, the mirror area detecting gating signal Gm, servo region detecting gating signal Gs and the clock detecting gating signal Gc are supplied to the servo error signal generator 28, whereas the data region detecting gating signal Gd and the address data area detecting gating signal Ga are supplied to an arithmetic-logical unit 31 as later explained.

The unique pattern detection circuit 27 also generates, from the push-pull signal produced on reproducing the clamp pits $P_{CLMP}$ making up the clamp area Zc, a clock pulse Pc which rises during zero detection as the push-pull signal is changed from the (−) polarity to the (+) polarity, and outputs the generated clock pulse Pc.

Referring to the recording format shown in FIGS. 3 and 6, three clamp pits $P_{CLMP}$ are formed in the inner peripheral pit string with the mirror surfaces or lands M in-between, and three mirror surfaces or lands M are formed with clamp pits $P_{CLMP}$ in-between, so that there exist two timings at which the push-pull signal is changed in polarity from the (−) polarity to the (+) polarity and hence two clamp pulses Pc are outputted per segment.

The clamp pulses Pc, outputted from the unique pattern detection circuit 27, are routed to the clamp circuit 25, as mentioned previously.

A defect indicating flag is logically allocated in a memory built in the inside of the unique pattern detection circuit 27. The defect indicating flag is constructed of at least one bit and is set to "1" via an inner control unit when any one of the unique patterns results in failure. If detection of all of the unique patterns is achieved successfully, the flag is set to "0". The bit information Df of the defect indicating flag is routed to the detection circuit 30.

The threshold value calculating circuit 29 fetches the reference pit information recorded in the header of each sector from the push-pull signal Dpp and the digital RF signal from the digital equalizer 26, and calculates threshold value data $D_{th}$ from the thus fetched reference pit information. The threshold value data $D_{th}$ is routed to the detection circuit 30.

Based upon the threshold value data $D_{th}$ from the threshold value calculating circuit 29, the detection circuit 30 carries out detection of the PR (1, 1) of the digital RF signal $D_{RF}$ and the PR (1, 1) of the push-pull signal $D_{PP}$. It should be noted in particular that two kinds of detection techniques are stored as algorithm in a program memory of the detection circuit 30. One of the techniques is the so-called bit-by-bit system algorithm of carrying out detection based on the threshold value data $D_{th}$ from the threshold value calculating circuit 29 and the other technique is the Viterbi decoding based algorithm.

Which of these techniques should be employed depends upon design data, such as the recording density, of the optical disc 1 being reproduced. That is, detection of the push-pull signal $D_{PP}$ and the RF signal $D_{RF}$ by the bit-by-bit system is inferior to that by Viterbi decoding insofar as suppression of the inter-symbol interference is concerned. However, it is a technique which may be advantageously employed in reproduction of the optical disc 1 of a lower recording density. Detection of the push-pull signal $D_{PP}$ and the RF signal $D_{RF}$ by the Viterbei decoding system is higher in its detection capability than that by the bit-by-bit system, and is capable of improving the S/N ratio by 3.6 dB, so that it is a detection technique which may be advantageously employed for reproducing the high recording density optical disc 1.

The push-pull signal $D_{pp}$ and the RF signal $D_{RF}$, detected by the detection circuit 30 by PR (1, 1), are routed to a downstream side arithmetic-logical unit 31.

Based upon the push-pull signal $D_{PP}$ and the RF signal $D_{RF}$ from the detection circuit 30 by PR (1, 1), the arithmetic-logical unit 31 reproduces the data recorded on the optical disc 1. The arithmetic-logical unit 31 has two types of the arithmetic-logical circuits, namely an address data processor 32 and a recording data processor 33, and a control circuit 34 controlling these processors 32, 33 and combining playback data from the processors 32, 33 into a sole output data string. Gating circuits, not shown, are provided at an initial stage of each of the processors 32 and 33. The unit 31 also includes a memory 35 for transiently storing data responsible for error generation during reproduction via the control circuit 34.

The address data processor 32 and the recording data processor 33 are explained in detail. First, the address data processor 32 has a gating circuit, not shown, connected to an initial stage thereof which is opened when both the data region detecting gating signal Gd and the address data region detecting gating signal Ga from the unique pattern detection circuit 27 are both at a high level, in order to permit the push-pull signal $D_{PP}$ and the RF signal $D_{RF}$ from the detection circuit 30 to be routed to the address data processor 32.

That is, in the present embodiment, the push-pull signal $D_{PP}$ and the RF signal $D_{RF}$ are caused to enter the address data processor 32 selectively, such that the push-pull signal $D_{PP}$ and the RF signal $D_{RF}$ are allowed to enter the address data processor 32 only when both the data region detecting gating signal Gd and the address data region detecting gating signal Ga from the unique pattern detection circuit 27 are at a high level.

That is, the push-pull signal $D_{pp}$ and the RF signal $D_{RF}$, produced by reproducing the access code and the data code recorded in each address data area Za of the address segment and the address/data segment, are caused to enter the address data processor 32. The address data processor 32 reproduces the access code and the sector code recorded on the optical disc 1, based upon the output timing of the clock signals Sc from the PLL circuit 22, by forming a matrix of the input push-pull signal $D_{PP}$ and the RF signal $D_{RF}$.

The following Table 1 shows the matrix for reproducing data recorded on the optical disc 1.

TABLE 1

| | | push-pull signal | |
|---|---|---|---|
| | + | o | − |
| RF signal H | x | O | x |
| M | O | O | O |
| L | x | O | x |

In the above Table 1, the polarities of the push-pull signals $D_{PP}$ and the signal levels of the RF signals $D_{RF}$ are arrayed in the rows and columns, respectively. Referring to Table 1, if the RF signal $D_{RF}$ is a high (H) level signal, there is no pit P in the beam spot BS and hence the push-pull signal $D_{PP}$ cannot be produced, so that the state (+) or (−) of the push-pull signal $D_{PP}$ cannot be assumed. Consequently, there cannot exist a state of the RF signal $D_{RF}$ being at a high (H) level and the push-pull signal $D_{PP}$ being of the (+) or (−) polarity.

If the RF signal $D_{RF}$ is of a mid-level value (M), there exists only one pit P within the beam spot BS, or there exists a boundary between the pit P and the land M in the inner peripheral pit string or in the outer peripheral inverted pit string. In the former and latter cases, the push-pull signal $D_{PP}$ assumes the state of "+" or "−" or the state of 0, respectively.

On the other hand, if the RF signal $D_{RF}$ is of the low (L) level, there exist two pits P in the beam spot BS, and hence the push-pull signal $D_{PP}$ cannot be produced, so that the state of the push-pull signal $D_{PP}$ being "+" or "−" cannot be assumed. Consequently, there cannot exist the state of the RF signal $D_{RF}$ being of the low (L) level and the push-pull signal $D_{PP}$ being of the "+" or "−" polarity.

By the data region detecting gating signal Gd and the address data detecting gating signal Ga, the set of the push-pull signal Dpp and the RF signal $D_{RF}$ in the data region Zd enter the address data processor 32. The processor 32 formulates data consisting in the input RF signal and the push-pull signal in which the push-pull signal is of zero polarity and is "1" or "0" when the RF signal is of a low level (L) or otherwise, respectively, in order to reproduce the access code and the sector code in each address data area Za in the address segment and in the sector code.

On the other hand, the gating circuit, not shown, connected to the initial stage of the recording data processor 33, is opened when only the data region detection gate signal Gd from the unique pattern detection circuit 27 is of a high level, in order to permit the push-pull signal $D_{PP}$ and the RF signal $D_{RF}$ to be routed from the detection circuit 30 into the recording data processor 33.

That is, in the present embodiment, the push-pull signal $D_{PP}$ and the RF signal $D_{RF}$ are caused to enter the recording data processor 33 selectively, such that the push-pull signal $D_{PP}$ and the RF signal $D_{RF}$ are inputted to the recording data processor 33 when only the data region detecting gating signal Gd from the unique pattern detection circuit 27 is of a high level.

That is, the push-pull signal $D_{PP}$ and the RF signal $D_{RF}$, produced by reproducing recording data recorded in each recording data area Zw of the data segment and the address/data segment, are inputted to the recording data processor 33. The recording data processor 32 reproduces the recorded data on the optical disc 1, based upon the output timing of the clock signals Sc from the PLL circuit 22, by forming a matrix of the input push-pull signal $D_{PP}$ and the RF signal $D_{RF}$.

Specifically, since the signal level of the RF signal $D_{RF}$ entering the recording data processor 33 is usually of the mid level (M), data reproduction is actually performed based upon the combination for the row of the mid-level value (M) of the RF signal $D_{RF}$ in Table 1. That is, data which becomes logical "1" and "0" when the push-pull signal $D_{pp}$ becomes zero or is of the "+" or "−" level are produced, by way of reproducing recording data recorded on the optical disc 1.

The address data reproduced by the address data processor 32 and the recording data processor 33 are routed over an interface bus, such as an SCSI bus 36, so as to be stored in an array variable storage region of a main memory or an auxiliary memory within the computer.

In addition to the above-mentioned components, a data defect circuit, not shown, for detecting the recording data, is built in the recording data processor 33. The recording data defect circuit generates an error signal set when the signal level of the RF signal $D_{REF}$ entering the recording data processor 33 is not the mid level (M), and routes the generated error signal to the control circuit 34. Based upon the inputting of the error signal Set from the recording error processor 33, the controller 34 stores the defect recording data from the recording error processor 33 in the pre-set array variable region of the memory 35 along with the corresponding address data. The address data is maintained in the memory 35 until re-delivery of the data concerning the stored address. If the address data which is the same as the stored address is re-delivered, the re-delivered data is transmitted to a host computer over an interfacing bus 36 along with the address data.

If the information Df of the defect indicating flag supplied from the unique pattern detection circuit 27 to the detection circuit 30 indicates a defect, as when it is a logical "1" data, detection by PR (1, 1) of the RF signal $D_{RF}$ is again performed, or a data signal indicating "warning" is outputted to the control circuit 34 of the arithmetic-logical unit 31. If supplied with the data signal "warning" from the detection circuit 30, the control circuit 34 causes the reproduced data and the addresses of the data to be stored in a pre-set array variable region of the memory 35 built in the arithmetic-logical unit 31. The data concerning the address is maintained in the memory 35 until re-delivery of data concerning the same address as the stored address. In case of re-delivery of the data concerning the same address as the stored address, the re-delivery data is transmitted to the host computer over the interfacing bus 36 along with the address.

Next, the servo control related constitution is explained. Three gate circuits, not shown, are built into an initial stage of the servo error signal generator 28, and are designed to be opened by high-level inputs of the mirror area detecting gating signal Gm, servo region detecting gating signal Gs and the clock detecting gating signal Gc, respectively.

The servo error signal generator 28 has built therein a spindle servo error signal generating circuit, not shown, for generating a spindle servo error signal Es for controlling the spindle motor 4, a focusing error signal generating circuit, not shown, for generating a focusing error signal Ef for servo controlling the focal length of the laser beam L by the objective lens 13, and a tracking error signal generating circuit, not shown, for generating a tracking error signal Et for servo controlling the tracking of the beam spot BS, Downstream of the servo error signal generating circuit 28 is connected a servo circuitry 38 via a phase compensator 37. The servo circuitry 38 has built therein a spindle servo control circuit, not shown, for servo-controlling the spindle motor 4, a focusing servo controlling circuit, not shown, for servo controlling the focal length of the laser beam L by the objective lens 13 and a tracking servo controlling circuit, also not shown, for servo controlling the tracking of the beam spot BS.

To the servo error signal generating circuit 28, digital RF signals $D_{RF}'$, processed with digital equalization by the digital equalizer 26, are caused to enter selectively via the three gating circuits. Of these three gating circuits, the first gating circuit is responsive to the high-level clock detecting gating signal Gc to transmit the digital RF signals $D_{RF}'$ to the spindle servo error signal generating circuit, while the second gating circuit is responsive to the high level mirror area detection signal Gm to transmit the digital RF signals $D_{RF}'$, as calculated based upon astigmatic aberration, to the focusing error signal generating circuit. The third gating signal responsive to the high level servo region detecting gating signal Gs to transmit the digital RF signals $D_{RF}'$ to the tracking error generating circuit.

The spindle servo error signal generating circuit generates the clock pulse signal Es which rises based upon the output timing of the input digital RF signals $D_{RF}'$. The clock pulse signal Es is routed via the phase compensation circuit 37 to the spindle servo control circuit within the servo circuitry 38 via the phase compensation circuit 38. The spindle servo control circuit servo controls the spindle motor 4 based upon the clock pulse signal Es supplied thereto for running the optical disc 1 in stable rotation in accordance with, for example, the CAV system.

The focusing error signal generating circuit calculates the difference between the signal level of the input digital RF signals $D_{RF}'$ and a pre-set mirror level and routes the difference signal Ef to the focusing servo controlling circuit of the servo circuitry 38 via the phase compensation circuit 37. The focusing servo controlling circuit causes the control current to flow in a focusing coil of a two-dimensional actuator 17 so as to reduce the signal level of the supplied difference signal Ef in order to shift the objective lens 13 in a direction towards and away from the optical disc 1 by way of performing focal point adjustment of the objective lens 13.

Turning to the tracking servo control, the arraying pattern of the servo marks Ms making up the servo area Zss is changed at an interval of three tracks. If an imaginary track T, is assumed to be present between two neighboring tracks $T_1$ and $T_2$ the arraying pattern of the servo marks Ms becomes different for every three tracks inclusive of the imaginary track T. Consequently, the digital RF signals $D_{RF}'$, entering the tracing error signal generating circuit from the digital equalizer 26, is the three-phase signal having different phases with respect to the first track $T_1$, imaginary track T and the second track $T_2$.

Figure 13A:
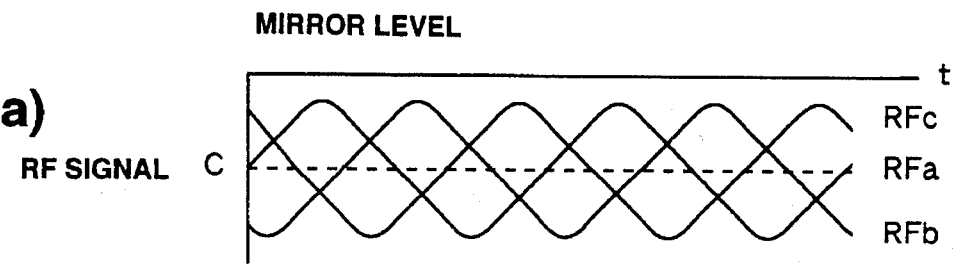
FIGS. 13(*a*) through 13(*e*) are timing charts showing the operation of the tracking servo in the playback system in the disc reproducing device according to the embodiment shown in FIG. 8.

If a track jump is made, such that the beam spot BS of the laser beam L is swept obliquely relative to the track, by way of seeking, the digital RF signals $D_{RF}'$, inputted from the digital equalizer 26, is comprised of three sine waves dephased 120° relative to one another, that is a first RF signal RFa, entering at a timing corresponding to the region A, a second RF signal RFb, entering at a timing corresponding to the region B and a third RF signal RFb entering at a timing corresponding to the region C, as shown in FIG. 13a.

Figure 14:
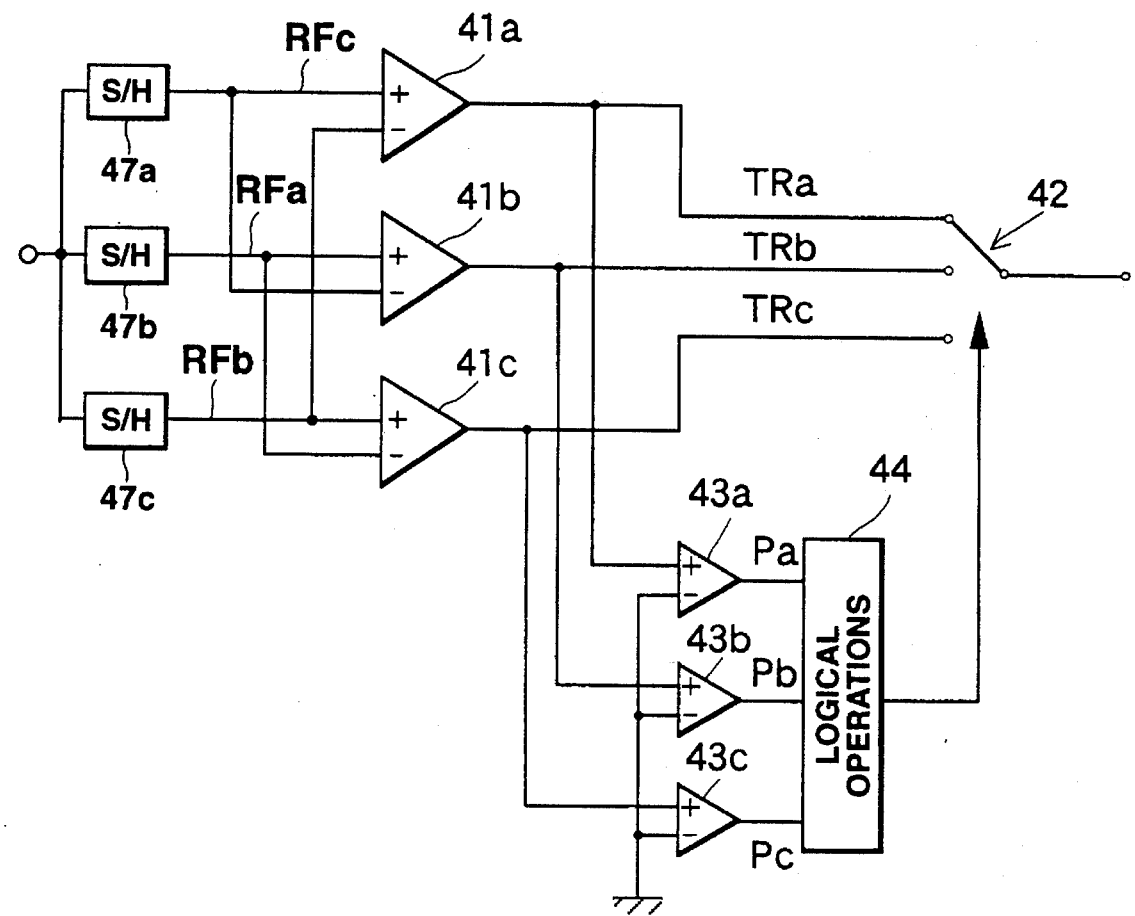
FIG. 14 is a circuit diagram of an example of a tracking error signal generating circuit built into the reproducing system, above all, the servo error signal generating circuit, according to the embodiment shown in FIG. 8.

As shown in FIG. 14, the tracking error signal generating circuit includes sample-and-hold circuits 47a, 47b and 47c for sample-holding the digital RF signals $D_{RF}'$ from the digital equalizer 26 with sampling clocks dephased 120° relative to one another, differential amplifiers 41a, 41b and 41c for finding the differences of the first, second and third RF signals RFa, RFb and RFc from the sample-and-hold circuits 47a to 47c, a multiplexor 42 for selecting one of outputs of the differential amplifiers 41a, 41b and 41c, comparators 43a, 43b and 43c for detecting the polarities of the outputs of the differential amplifiers 41a, 41b and 41c and an arithmetic-logical circuit 44 for controlling the multiplexor 42 based upon a pre-set arithmetic-logical operation on the outputs of the comparators 43a, 43b and 43c.

Figure 13B:
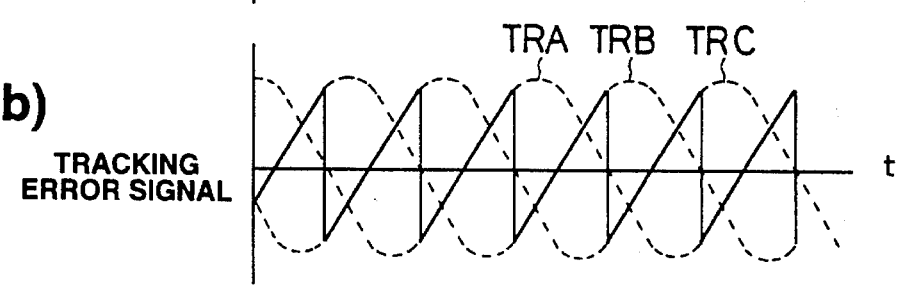

Referring to FIG. 13b, the differential amplifier 41a subtracts the second RF signal RFb from the third RF signal RFc to produce the tracking error signal TRa, indicated by a broken line. The differential amplifier 41b subtracts the third RF signal RFb from the first RF signal RFa to produce the tracking error signal TRb, indicated by a broken line. The differential amplifier 41c subtracts the first RF signal RFa from the second RF signal RFb to produce the tracking error signal TRc, indicated by a broken line.

Thus the tracking signals TRa, TRb and TRc are sine waves dephased by 120° relative to one another and facing phase-lead of 90° with respect to the RF signals TRa, TRb and TRc. The tracking error signals TRa, TRb and TRc thus produced are routed to the multiplexor 42 and to comparators 43a, 43b and 43c.

Meanwhile, the tracking error signals TRa, TRb and TRc are of a dynamic range which is due to the diffraction at the servo pit Ms, as shown in FIG. 4a, and which may be increased in magnitude as compared to that of the conventional optical disc. In other words, the tracking error signals TRa, TRb and TRc having a superior S/N ratio may be obtained.

Figure 13C:
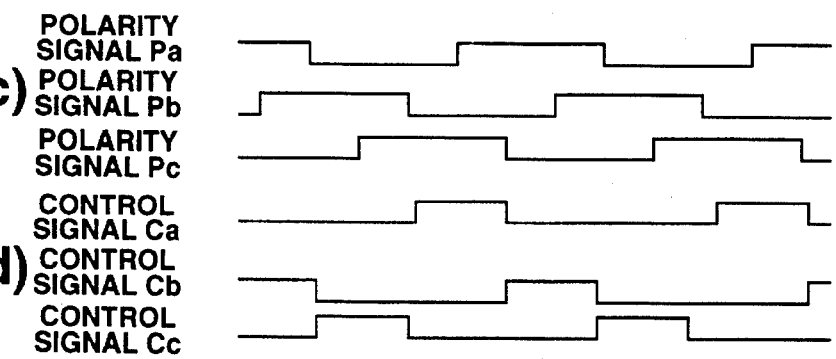

Referring to FIG. 13c, the comparators 43a, 43b and 43c detect the polarities of the tracking error signals TRa, TRb and TRc and, if the signal level is positive, the comparators generate polarity signals Pa, Pb and Pc, which are routed to the arithmetic-logical circuit 44. The arithmetic-logical circuit 44 calculates control signal Ca, Cb and Cc, dephased 120° relative to one another, in accordance with the following equations (1) to (3):

$$Ca = Pc \cap INV(Pb) \quad (1)$$

$$Cb = Pa \cap INV(Pc) \quad (2)$$

$$Cc = Pb \cap INV(Pa) \quad (3)$$

and controls the multiplexor 42 for selecting the tracking error signals TRa, TRb and TRc when the control signals Ca, Cb and Cc are logical "1", respectively.

In the equations (1) to (3), the symbols ∩ and INV ( ) stand for logical product and negative logic, respectively.

The multiplexor 42 outputs a three-phase tracking error signal, which is produced by periodically changing over the three-phase tracking error signals TRa, TRb and TRc, as shown by a solid line in FIG. 13(b). The tracking error signal is routed to the phase compensation circuit 37.

The tracking error signal, phase-compensated by the phase-compensation circuit 37, is routed to a tracking servo circuit of the servo circuitry 38. The tracking servo control circuit causes the control current to flow through a tracking coil of the two-dimensional actuator 17, until the signal level of the supplied tracking error signal becomes equal to zero, thereby causing the objective lens 13 to be moved along the radius of the optical disc land causing the center of the beam spot BS to scan the track center Tc, by way of performing tracking adjustment.

Figure 24:
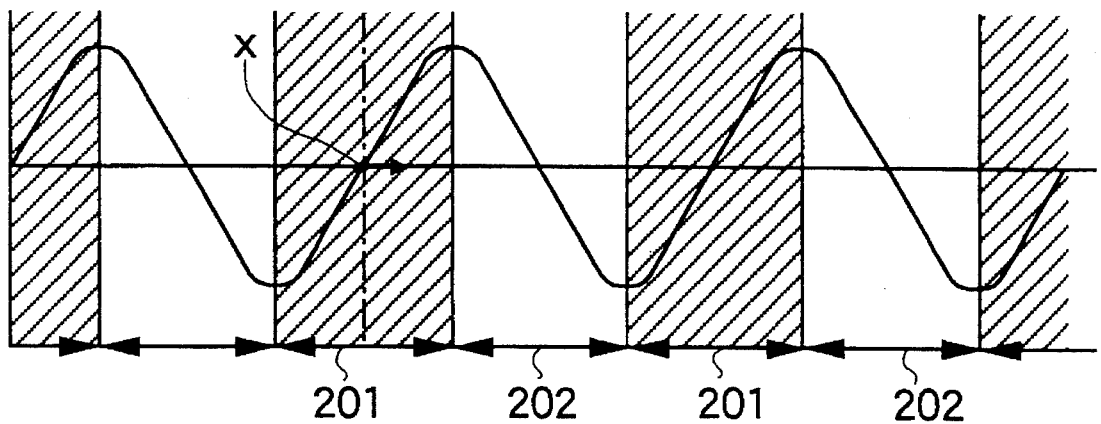
FIG. 24 is a waveform diagram showing tracking error signals produced on reproducing the conventional optical disc.

As shown in FIG. 13(b), the tracking error signal outputted from the tracking error signal generating circuit is devoid of an area 202 other than an area which permits of stable tracking servo, as already explained with reference to FIG. 24, so that perpetually stable tracking servo may be achieved.

In addition, if assumed that the tracking error signal shown in FIG. 13b is the signal produced when the laser beam L is seeking from the outer periphery towards the inner periphery of the disc, the waveform is one which retrogresses along the time scale. Thus, for seeking from the inner periphery towards the outer periphery, the signal level is perpetually increased in a range experiencing the continuously changing signal level, whereas, for seeking from the outer periphery towards the inner periphery, the signal level is perpetually decreasing in the range experiencing the continuously changing signal level.

Consequently, it becomes possible to detect the direction of movement of the spot BS of the laser beam L depending upon the direction of level changes in the range having the continuously changing signal level. In other words, it becomes possible with the present reproducing system to produce the tracking error signals containing the information concerning the seek direction.

The tracking error signal generating circuit may be simplified in circuit construction because there is no necessity of providing dividers or memories as required in the conventional playback system.

Figure 15:
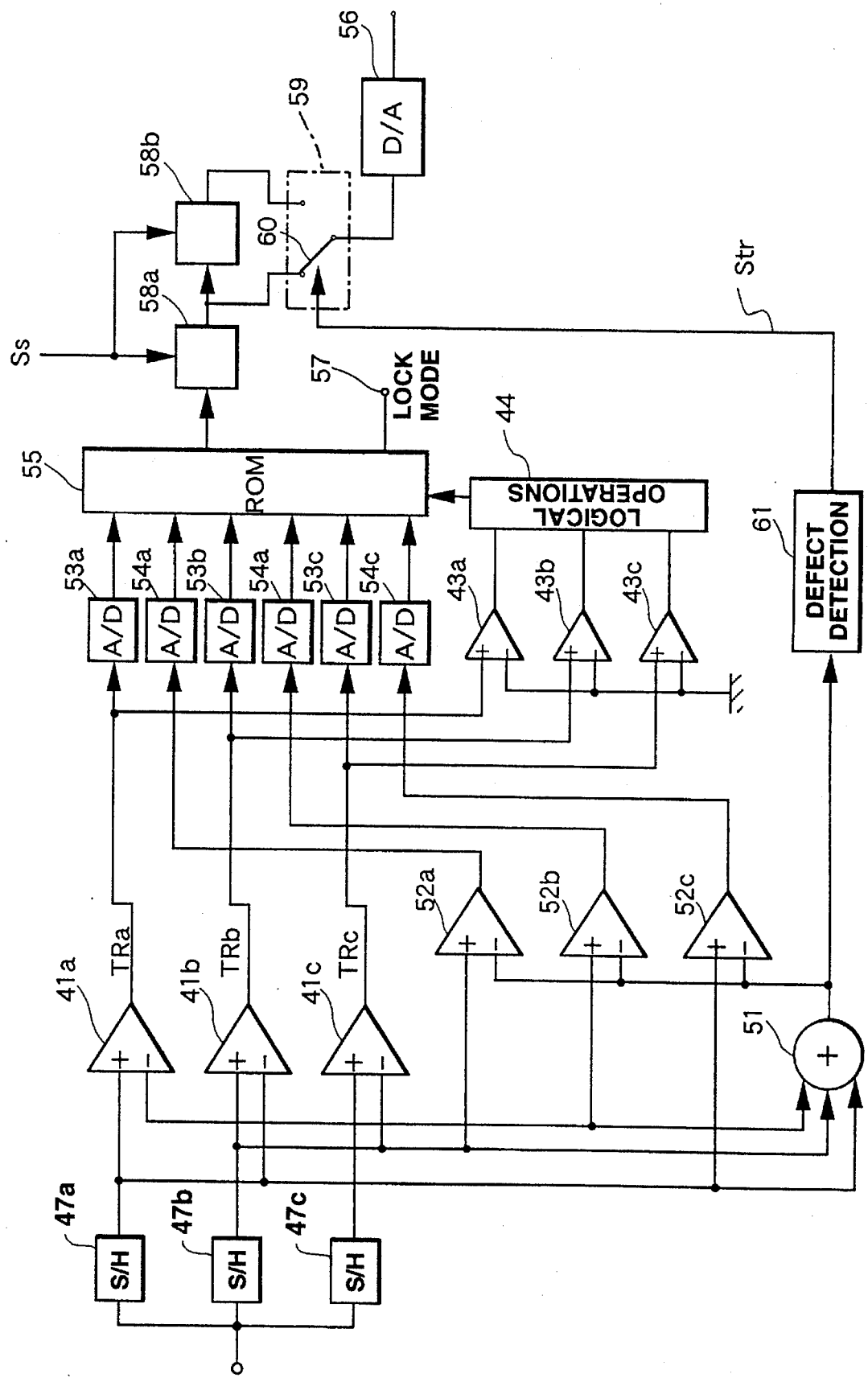
FIG. 15 is a circuit diagram showing another embodiment of the tracking error signal generating circuit.

Referring to FIG. 15, a modified circuit construction of the above-mentioned tracking error signal generating circuit is explained. Meanwhile, the circuit having the same function as that of the tracking error signal generating circuit shown in FIG. 14 is indicated by the same reference numerals and the corresponding description is omitted for avoiding redundancy.

Referring to FIG. 15, the tracking error signal generating circuit having the modified circuit construction includes sample-and-hold circuits 47a, 47b and 47c for sample-holding the RF signals $D_{RF}'$ from the digital equalizer 26, and differential amplifiers 41a, 41b and 41c for finding the differences among the RF signals RFa, RFb and RFc from the digital equalizer 26, outputted from the sample-and-hold circuits 47a, 47b and 47c. The tracking signal generating circuit also includes an additive node 51 for summing the RF signals RFa, RFb and RFc from the digital equalizer 26 and differential amplifiers 52a, 52b and 52c for subtracting an output of the additive node 51 from the RF signals RFa, RFb and RFc from the digital equalizer 26. The tracking error signal generating circuit also includes first A/D converters 53a, 53b and 53c for converting the outputs of the differential amplifiers 41a, 41b and 41c into digital signals, and second A/D converters 54a, 54b and 54c for converting the outputs of the differential amplifiers 52a, 52b and 52c into digital signals. The tracking signal generating circuit also includes a ROM 55 for outputting the tracking error signals, using the tracking error signals, supplied from the first and second A/D converters 53a, 53b and 53c and 54a, 54b and 54c, as addresses, and a D/A converter 56 for converting the tracking error signals, supplied as digital signals from the ROM 55, as digital signals. The tracking signal generating circuit finally includes comparators 43a, 43b and 43c for detecting the polarities of the outputs of the differential amplifiers 41a, 41b and 41c and an arithmetic-logical circuit 44 for controlling the ROM 55 based upon a pre-set arithmetic-logical operation on the outputs of the comparators 43a to 43c.

Between the ROM 55 and the D/A converter 56, there are connected a first latch circuit 58a for fetching the tracking error signal from the ROM 55 based upon the input of the servo clock signal Ss from the timing generator 23 for holding the tracking error signal as the current tracking error signal, a second latch circuit 58b for fetching the tracking error signal outputted from the first latch circuit 58a based upon the input of the servo clock signal Ss from the timing generator 23 for holding the tracking error signal as the temporally previous tracking error signal and a switching circuit 59 for selectively coupling outputs of the first latch circuit 58a and the second latch circuit 58b to the downstream side D/A converter 56. The switching circuit 59 is normally operated for setting a movable contact of a switch 60 towards the first latch circuit 58a for routing the current tracking error signal to the D/A converter 56.

The differential amplifiers 41a, 41b and 41c generate tracking error signals TRa, TRb and TRc, which are sine waves dephased 120° relative to one another and which have a phase lead of 90° with respect to the associated RF signals RFa, RFb and RFc, respectively, as shown in FIG. 13b, and transmit these tracking signals TRa, TRb and TRc to the first A/D converters 53a, 53b and 53c and to the comparators 43a, 43b and 43c, respectively.

The first A/D converters 53a, 53b and 53c translate the tracking error signals TRa, TRb and TRc to digital signals and route the digitized tracking error signals TRa, TRb and TRc to the ROM 55 as addresses.

The additive node 51 sums the RF signals RFa, RFb and RFc from the digital equalizer 26 and transmits the sum, that is the mean value of the three-phase alternating current RF signals RFa, RFb and RFc, to the differential amplifiers 52a, 52b and 52c, as shown in FIG. 13a. It is noted that the mean value is a median value which is a constant C.

The differential amplifiers 52a, 52b and 52c subtract the mean value C from the RF signals RFa, RFb and RFc, that is, shift the RF signals RFa, RFb and RFc, by the mean value C, in order to provide the RF signals RFa, RFb and RFc freed of the dc component, and transmit the RF signals RFa, RFb and RFc, freed of the dc component to the second A/D converters 54a, 54b and 54c, respectively.

The second A/D converters 54a, 54b and 54c convert the RF signals freed of the dc component to digital signals and transmit the digitized RF signals to the ROM 55 as addresses.

In this manner, the digitized tracking error signals TRa, TRb and TRc and the RF signals RFa, RFb and RFc are supplied to the ROM 55, in which there is pre-stored a data table satisfying a certain relation as concerns with the tracking error signals TRa, TRb and TRc and the RF signals RFa, RFb and RFc. Thus the ROM 55 outputs the tracking error signal shown by a solid line in FIG. 13e, using the tracking error signals TRa, TRb and TRc and the RF signals RFa, RFb and RFc as the addresses.

Specifically, if the displacement of the beam spot BS of the laser beam L from the track center Tc is x, the track pitch is p, and the RF signal RFa from the digital equalizer 25 is $V_{QA}$, which $V_{QA}$ is represented by the following equation (4):

$$V_{QA} = K_1 \cos(2\pi x/p) + C \quad (4)$$

an output $v_{QA}$ of the differential amplifier 52a is represented by the following equation (5):

$$v_{QA} = V_{QA} - C = K_1 \cos(2\pi x/p) \quad (5)$$

On the other hand, since the tracking error signal TRa from the differential amplifier 41a is dephased by 90° from the RF signal RFa, the tracking error signal TRa, indicated as $v_{PA}$, is represented by the following equation (6):

$$v_{PA} = K_2 \sin(2\pi x/p) \quad (6)$$

where $K_2/K_1 = 1$.

From these equations (5) and (6), a signal $v_x$ indicating the displacement x is obtained from the following equation (7):

$$v_x = (p/2\pi) \tan^{-1}(v_{PA}/v_{QA}) \quad (7)$$

Figure 13D:
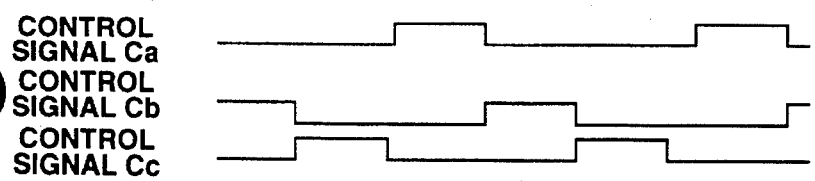
Figure 13E:
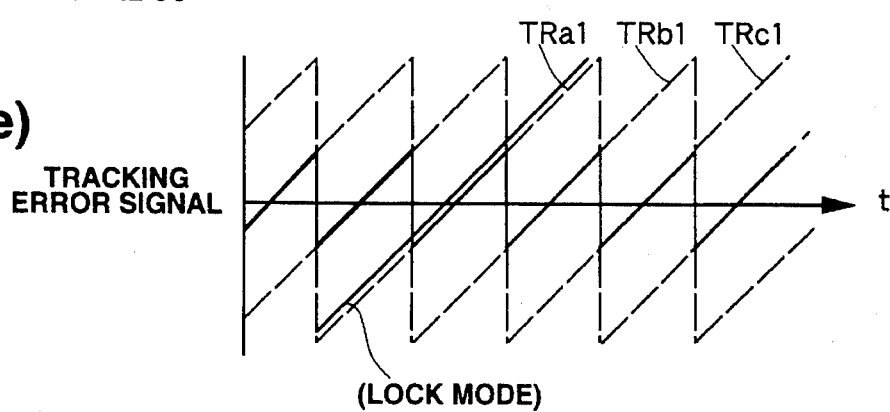

It is noted that, since the signal $v_x$ is proportional as a principle to the displacement x in a range of $|x| < (p/4)$, values on a straight line extended from a segment of a line in the range of $|x| < (p/4)$ are stored in a range of from $|x| < (3p/2)$ in the ROM 55, and the data table is looked up using the digitized tracking error signal TRa ($v_{pa}$) and the RF signal RFa ($v_{QA}$) in order to obtain the tracking error signal TRa$_1$ shown by a broken line in FIG. 13e.

Similarly, data tables for the remaining tracking error signals TRb$_1$, TRc$_1$ are stored and read out using the digitized tracking error signal TRb and the RF signal RFb or using the tracking error signal TRc and the RF signal RFc.

The above-mentioned control signals Ca, Cb and Cc from the arithmetic-logical circuit 44, shown in FIG. 13d, are supplied as readout control signals to the ROM 55, to which a changeover control signal between the normal mode and the lock mode is also supplied via a terminal 57. The tracking error signals TRa$_1$, TRb$_1$ and TRc$_1$ are selected for the control signals Ca, Cb and Cc equal to logical "1", respectively, for outputting a tracking error signal which is obtained by periodically changing over the three-phase tracking error signals TRa$_1$, TRb$_1$ and TRc$_1$, dephased relative to one another, as shown in FIG. 13e.

One of the tracking error signals TRa$_1$, TRb$_1$ and TRc$_1$ is selected and outputted during the lock mode without regard to the control signals Ca, Cb and Cc.

In the tracking error signal generating circuit of the modified circuit construction, a defect detection circuit 61 is connected downstream of the additive node 51. If the seek operation is going on as normally, the sum of the first, second and third RF signals RFa, RFb and RFc (mean value C) shown in FIG. 13(a) is set at a pre-set reference value. Consequently, if the above-mentioned sum (mean value) of the first, second and third RF signals RFa, RFb and RFc is not fixed at the pre-set reference value, some defect is occurring in the seek operation.

The defect detection circuit 61, adapted for detecting such defects in the seek operation, compares the sum value (mean value) from the additive node 51 to a reference value, and outputs a changeover signal Str having a signal waveform corresponding to the result of comparison to the switching circuit 59. That is, if the result of comparison exceeds a pre-set allowable range, the detection circuit 61 deems that there is some defect, and outputs a high-level signal as a changeover signal Str. Conversely, if the result of comparison is not in excess of the allowable range, the detection circuit deems that there is no defect and outputs a low-level signal as the changeover signal Str. Based upon the input of the changeover signal Str from the defect detection circuit 61, the switching circuit 59 changes over the switch 60 towards the side of the second latch circuit 58b, during the time the changeover signal Str is at the high level, in order to transmit the directly previous tracking error signal to the D/A converter 56. The switching circuit selects the switch 60 towards the side of the first latch 58a during the time the changeover signal Str is in the low level, which is the normal condition in order to transmit the current tracking error signal to the D/A converter 56.

The track error signal read out from the ROM 55 as described above is converted by the D/A converter 56 to analog signals which are routed via the phase compensation circuit 37 to the tracking servo control circuit of the servo circuitry 38 in the same manner as in the previous embodiment. As a result, the tracking error signal is devoid of the range 202 other than the range 201 corresponding to the stable tracking servo control (see FIG. 24) so that stable tracking servo control may be perpetually achieved. Besides, the tracking error signal containing the information as to the seek direction may also be obtained.

Referring to FIG. 4(a), the operation of track jump is explained. If track jump is made from the first track T$_1$ to the second track T$_2$ as the first track T$_1$ is under tracking control, the control signal is supplied via terminal 57 in order to change over the readout from the ROM 55 compulsorily from the tracking error signal TRa$_1$ to the tracking error signal TRb$_1$. The lock mode is then set for which tracking error signals cannot be changed over irrespective of the control signals Ca, Cb or Cc.

Figure 16:
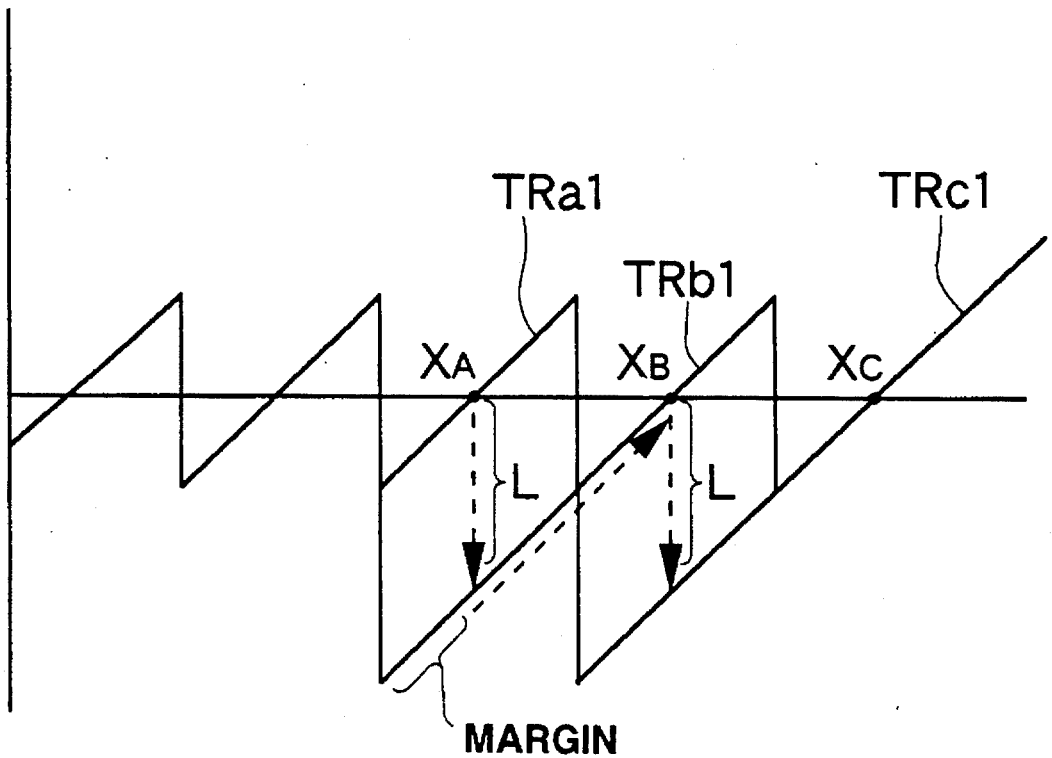
FIG. 16 is a timing chart showing the operation of the tracking servo, above all, track jump, in the reproducing system of the disc reproducing device according to the embodiment shown in FIG. 8.

Specifically, when the tracking is on the first track T$_1$, the beam spot BS of the laser beam is at the track center Tc of the first track T$_1$ corresponding to the zero-crossing point X$_A$ of the tracking error signal TRa$_1$, for the control signal Ca being in the logical "1", as shown in FIG. 16.

If, in this state, the signal readout from the ROM 55 is switched to the tracking error signal TRb$_1$, without regard to the control signals Ca, Cb and Cc, a level L signal is outputted from the ROM 55. The two-dimensional actuator 17 shifts the beam spot BS of the laser beam L towards the track center of the imaginary track T, corresponding to the zero-crossing point X$_0$ of the tracking error signal TRb$_1$, so that the level L will become smaller.

Subsequently, a control signal is applied via terminal 57, in the same manner as described above, to force a switching of the readout from the ROM 55 from the tracking error signal TRb$_1$ to the tracking error signal TRc$_1$. Since the spot BS of the laser beam L is at the track center of the imaginary track T corresponding to the zero-crossing point $X_B$ of the imaginary track T, if the readout from the ROM 55 is switched so that the tracking error signal $TRc_1$ is read out, irrespective of the control signals Ca, Cb or Cc, the level L signal is outputted from the ROM 55. The two-dimensional actuator 17 shifts the spot BS of the laser beam L towards the track center Tc of the second track $T_2$ corresponding to the zero-crossing point $X_c$ of the tracking error signal $TRc_1$, so that the level L becomes smaller. This completes the track jump.

With the above-described tracking servo control, track jump may be performed in the closed loop condition, while it is unnecessary to open the tracking servo loop in contradistinction from the conventional practice. In other words, there is no necessity of providing circuit components (electronic devices) for opening the tracking servo control loop, thereby enabling cost reduction.

In addition, by providing the lock mode as described above, the capture range in the tracking servo control may be increased. For example, if switching is made from the tracking error signal $TRa_1$ to the tracking error signal $TRb_1$ for establishing the lock mode and subsequently some disturbance has occurred, a stable track jump may nevertheless be performed due to the presence of an operating margin as shown in FIG. 16.

The production process for the optical disc 1 of the above-described embodiment is explained. The production process is roughly divided into a mastering process and a replication process.

The mastering process is a process up to completion of a metal maser plate (stamper) employed in the duplication process. The duplication process is a process of producing a large quantity of optical discs 1 as replicas of the stamper.

In the mastering process, a photoresist is applied to a ground glass substrate, on which data are recorded as the bit string information by light exposure, using a laser beam, by way of performing laser cutting. The recording data need to be prepared in advance by a process known as pre-mastering.

After the end of the cutting, pre-set operations, such as development, are performed, after which the information is transcribed on the metal surface by, for example, electrocasting, in order to complete the stamper required in duplicating the optical discs.

Then, using the stamper, produced as described above, the information is transcribed on a resin substrate by, for example, the injection method. After forming the light reflective film thereon and performing finishing operations, an ultimate product is completed in a known manner.

Consequently, the information recording device for recording the information on the optical disc 1 is a so-called laser cutting device for forming the pit string information on the photoresist on the glass substrate using the laser beam.

Figure 17:
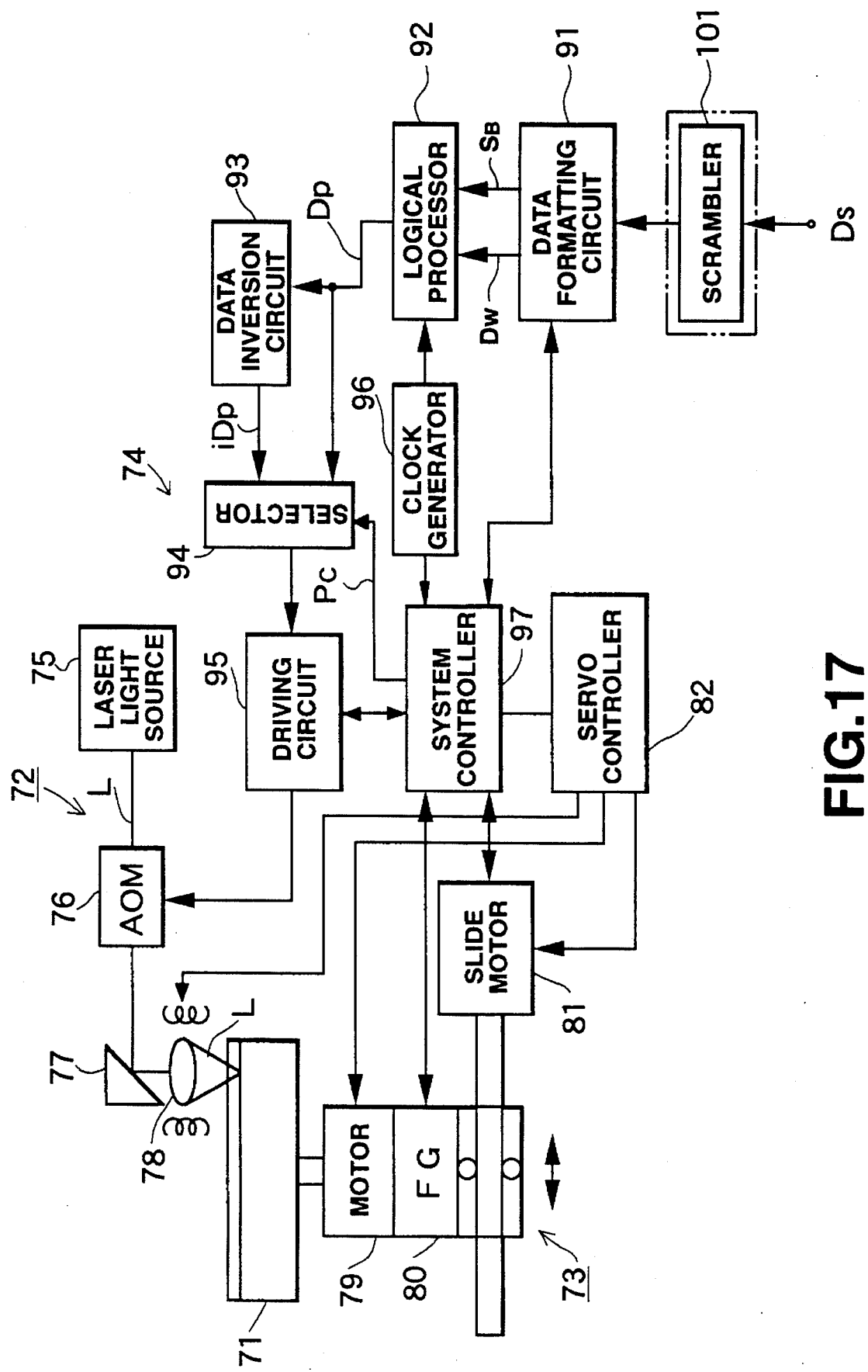
FIG. 17 is a block diagram showing an arrangement of a laser cutting device employed for producing the optical disc according to the first embodiment.

Referring to FIG. 17, the laser cutting device of the present embodiment is explained.

As shown therein, the laser cutting device includes an optical unit, 72 for radiating the laser beam L on the glass substrate 71 coated with the photoresist for forming the pit, string information on the photoresist surface, a rotating driving unit 73 for rotationally driving the glass substrate 71 and a signal processor 74 for converting the recording data into the pit string data information and controlling the optical unit 72 and the rotating driving unit 73.

The optical unit 72 includes a laser light source 75, a light modulator 76 for modulating light intensity of the outgoing light L from the light source 75 based upon the pit string data information, a prism 77 for bending the optical axis of the modulated light beam from the light modulator 76 and an objective lens 78 for converging the modulated and reflected light, beam from the prism 77 on the photoresist surface of the glass substrate 71.

The rotating driving unit 73 includes a motor 79 for rotationally driving the glass substrate 71 in accordance with the CAV system, an FG generator 80 for generating pulses (FG pulses) for detecting the rotational speed of the motor 79, a slide motor 81 for sliding the glass substrate 71 along its radius, and a servo controller 82 for performing various servo control operations, such as tracking control of the objective lens 78 or rotational speed control of the slide motor 81.

The signal processor 74 includes a data formatting circuit 91 for appending code data such as error correction code data to the source data Ds from a computer to form recording data Dw, an arithmetic-logical unit 92 for performing pre-set arithmetic-logical operations on the recording data Dw from the data formatting circuit 91 for converting the recording data to pit string information data Dp and a data inverting circuit 93 for inverting the logical data of constituent bits of the pit string information data Dp outputted from the arithmetic-logical circuit 92 for outputting inverted pit string data iDp. The signal processor 74 also includes a selector 94 for selecting one of the pit string information data Dp from the arithmetic-logical circuit 92 and the inverted pit string information data iDp from the data inversion circuit 93 based upon the input of the control signal Pc from the system controller 97 as later explained, and a driving circuit 95 for driving the light modulator 78 based upon output data of the selector 94. The signal processor 74 finally includes a clock generator 96 for supplying clock signals to the arithmetic-logical circuit 92 and a system controller 97 for controlling, above all, the servo controller 82, based upon the clocks from the clock generator 96.

With the above-described laser cutting device, the glass substrate 71 is rotated by the motor 79, at the same time as the glass substrate 71 is slid as it is kept in rotation.

Specifically, the servo controller 82 controls the slide motor 81 so that, while the motor 79 is controlled to cause rotation of the glass substrate 71 in accordance with the CAV system, the slide motor 81 is controlled so that the radial feed pitch is one-half the track pitch (0.8 μm).

The laser light source 75 comprises a He-Cd laser, for example, and causes the outgoing light L to be incident on the light modulator 76. The light modulator 76 of, for example, the acousto-optical effect type, modulates the light intensity of the outgoing light L from the laser light source L in accordance with output data from the selector 94, and Facilitates the intensity-modulated beam on the photoresist surface of the glass substrate 71 via the prism 77 and the objective lens 78. As a result, the photoresist is sensitized in accordance with output data of the selector 94.

The wavelength of the outgoing light L from the laser light source 75 and the numerical aperture NA of the objective lens 78 are set so that the spot diameter of the converged modulated light beam on the photoresist surface becomes equal to approximately one-fourth of the track pitch. Consequently, the photoresist is sensitized to a width of 0.4 to 0.5 μm.

The data formatting circuit 91 divides the source data Ds from the computer into sectors and segments and appends sector or segment addresses and error correction codes to the sectors and segments to produce the recording data Dw which is supplied to the downstream side arithmetic-logical circuit 92. The data formatting circuit 91 also routes tracking or focusing servo bytes $S_B$ to the arithmetic-logical circuit 92.

The arithmetic-logical circuit 92 appends the servo bytes $S_B$ from the data formatting circuit 91 to the leading end of the recording data Dw from the data formatting circuit 91, above all, to the leading end of the segment-based recording data Dw. The arithmetic-logical circuit 92 then performs pre-set arithmetic-logical operations on the recording data Dw, based upon the output timing of the clock signals from the clock generator 96, for conversion to pit string information data Dp.

As explained previously in connection with the reproducing method, the recording data Dw has the logical data corresponding to that of the playback data from the arithmetic-logical circuit 31 shown in FIG. 8. That is, the data string is logically "1" at the boundary between the pit P and the mirror surface M and is logically "0" otherwise. However, since data indicating whether or not the pit P is to be formed is required for actual laser cutting, the present arithmetic-logical circuit 92 converts the above-mentioned logic of the data string into the logic which depends upon the presence or absence of the pit P. In addition, with the optical disc 1 of the present embodiment, since the servo mark Ms of the servo region Zs is dephased by one-half of the clock, logical conversion in the arithmetic-logical circuit 92 is performed using the double frequency clock signal the period of which is one-half of the period of the clock signal Sc employed for reproduction.

In laser-cutting the photoresist by the above-described laser cutting device, if it is assumed that the objective lens 78, for example, is slid from the radially inner most side towards the radially outer most side of the glass substrate 71, as a result of the sliding movement of the glass substrate 71 caused by the slide motor 81, the first portion on which laser cutting is performed is a portion offset by one-fourth of the track pitch from the track center Tc of the inner most track towards the center of the glass substrate 71. That is, the inner peripheral portion of the track center Tc of the radially inner most track is processed with laser cutting.

Consequently, during the initial stage, the control signal Pc, that is a signal indicating selection of the pit string information data Dp from the arithmetic-logical circuit 92, is outputted from the system controller 97 to the selector 94. Based upon the input of the control signal Pc from the system controller 97, the selector 94 selects the pit string information Dp from the arithmetic-logical circuit 92 and routes the data Dp to the driving circuit 95.

The driving circuit 95 drives the light modulator 76 based upon the pit sting information Dp from the selector 94. As a result, the pit string corresponding to the pit string information data Dp is laser-cut on the inner peripheral portion of the track center Tc of the inner most track on the photoresist surface of the glass substrate 71.

After the glass substrate 71 is rotated one complete turn as the laser cutting is made on the radially inner most track as described above, the objective lens 78 is then positioned on the outer peripheral portion of the track center Tc of the radially inner most track. At this time, the system controller 97 outputs the control signal Pc, that is the signal indicating selection of the inverted pit string information data iDp from the data inverting circuit 93, to the selector 94, which then selects the inverted pit string data information iDp from the data inverting circuit 93, based upon the input of the control signal Pc from the controller 97, and routes the selected data iDp to the driving circuit 95.

The driving circuit 95 drives the light modulator 76 based upon the inverted pit string information data iDp from the selector 94. As a result, the inverted pit string corresponding to the inverted pit information data iDp is laser-cut in the outer peripheral portion of the track center Tc of the radially inner most track on the photoresist surface on the glass substrate 71.

The attributes of the control signal may be determined by a method comprising counting the number of FG pulses from the FG generator 80 in the system controller 97 for detecting the number of revolutions of the glass substrate 71 and determining the signal indicating the selection of the pit string information data Dp from the arithmetic-logical circuit 92 or the inverted pit string information data iDp from the data inverting circuit 93 as the attributes of the control signals Pc.

Subsequently, pit strings and inverted pit strings are laser-cut in a similar manner on the inner and outer peripheral sides of the pre-set track centers Tc, respectively.

After laser cutting on the photoresist by the above-mentioned laser cutting device, development and electrocasting operations are performed for completing the stamper. Using such stamper, the optical discs may be produced in large quantities.

With the above-described laser cutting device, the laser beam L is modulated in intensity by the light modulator 76. If the light converging position of the objective lens 78 is on a pre-set side, for example, on the inner peripheral side, of the track center Tc as a result of the laser spot scanning the inner peripheral side of the track center Tc, that is if the laser spot scans the inner peripheral side, the pit string information data Dp enters the driving circuit 95, driving the light modulator 76, via the selector 94, so that the laser beam L from the laser light source 75 is modulated in intensity depending on the pit string information data Dp. As a result, the pit string corresponding to the pit string information data Dp is formed on the inner peripheral side of the track center Tc.

If the light converging position of the objective lens 78 is on a pre-set side, for example, on the outer peripheral side, of the track center Tc as a result of the laser spot scanning the outer peripheral side of the track center Tc, that is if the laser spot scans the outer peripheral side, the inverted pit string information data iDp enters the driving circuit 95, driving the light modulator 76, via the selector 94, so that the laser beam L from the laser light source 75 is modulated in intensity depending on the inverted pit string information data iDp. As a result, the pit string corresponding to the inverted pit string information data iDp is formed on the outer peripheral side of the track center Tc.

Consequently, the completed optical disc 1 has the pit string comprising the pits P and the lands M and the inverted pit string comprising the pits P and the lands M inverted from those of the pit string, which are formed on the inner and outer peripheral sides of the track center Tc, respectively.

Since the pit string, comprising pits P and lands M, and the inverted pit string, which is the inversion of the pits P and the lands M of the pit string, are formed on the inner and outer peripheral sides of the track center Tc of the optical disc 1 of the present embodiment, respectively, if the pit string and the inverted pit string on the inner and outer peripheral sides of the track center Tc are thought of as one track of data, the proportion of the pits P and the lands M in the data region Zd per track in the pit string is equal to that in the inverted pit string.

Thus, when transcribing the recording pattern on the stamper, that is the pit string pattern comprising the pits P and the lands M, onto the resin substrate by the injection molding method, for producing the optical disc 1, it becomes possible to maintain uniform flowing velocity of the molten resin into the cavity, thereby eliminating molding defects in the course of the preparation of the optical discs.

On the other hand, if the inner peripheral pit string and the outer peripheral inverted pit string are scanned with the sole beam spot BS, the beam spot is modulated (that is diffracted) by, for example, the inner peripheral pit P and subsequently modulated, that is diffracted, by the outer peripheral side pit P. That is, the upper half, for example of the beam spot BS is modulated by the inner peripheral pit P, while the lower half of the beam spot BS is modulated by the outer peripheral pit P.

As a result, if the reflected light Lr of the laser beam L is photo-electrically converted by a photodetector 15 having its light receiving area divided into four equal parts, as shown in FIG. 11, the light volume of the reflected light Lr in its entirety becomes substantially equal. At this time, the reflected light Lr, modulated by the inner peripheral side pits P, is incident on light-receiving regions 15a and 15b associated with the inner peripheral side and thereby converted into electrical signals. Subsequently, the reflected light Lr, modulated by the outer peripheral side pits P, is incident on light-receiving regions 15c and 15d associated with the outer peripheral side and thereby converted into electrical signals.

Thus, if the push-pull signal Dpp is produced based upon the electrical signals from the photodetector 15, and playback signals are recovered based upon the push-pull signal Dpp, an optimum dc balance may be maintained, that is the digital sum value (DSV) may be reduced satisfactorily to zero. Since the optimum dc balance may be achieved spontaneously without modulation for stabilizing the dc balance, such as by EFM, it becomes possible to record the recording data directly as the pit information, without the necessity of modulation, such as EFM, thereby enabling high-density recording of the recording data.

As another means for efficiently reducing the DSV to zero, a scrambler circuit 101, shown by a double-dotted chain line frame, may be inserted upstream of the data formatting circuit 91 of the laser cutting device shown in FIG. 17. The source data Ds from the computer is scrambled in accordance with the scrambling rule registered in a memory built into the scrambler circuit 91, and the resulting scrambled data is caused to enter the downstream side data formatting circuit 91. In this case, a descrambler circuit 102, indicated by a double dotted chain line frame in FIG. 8, is inserted downstream of the arithmetic-logical unit 31. The descrambler circuit 102 has a memory therein in which a scrambling rule opposite to that of the scrambler circuit 101 is stored. Output data of the descrambler circuit 102 is the same as the recording data Dw prepared by the data formatting circuit 91.

The servo marks Ms, making up the servo region Zs, are formed with phase shift by one-half the clock, so that various data detected on the clock basis may be demarcated from the servo marks in timing, with the result that the servo marks Ms, that is the servo region Zs, may be easily detected by the unique pattern detection circuit 26 of the reproducing system for enabling high-speed accessing of the recording data.

With the reproducing method of the present embodiment, the laser beam L for reproduction is radiated on the track center Tc, and the push-pull signal Dpp is produced by calculation based upon the first and second push-pull signals $S_1$ and $S_2$ produced by light diffraction by the inner and outer peripheral pits P. The kinds of the recording pattern of the optical disc 1 may be detected based upon the polarity of the push-pull signal Dpp and the signal level of the RF signal $S_{RF}$. That is, the optical disc 1 has such recording pattern comprising the data region Zd carrying actual recording data and the mirror areas Zm and Zs employed for focusing servo control and tracking servo control, respectively.

Since the pit string constitution of the data region Zd comprises a pit string made up of pits P and the lands M on the inner peripheral side of the track center Tc, and an inverted pit string, made up of the pits and the lands inverted in array from those of the pit string, the playback laser beam L is necessarily modulated by one of the pits P. Consequently, the RF signal $S_{RF}$, obtained after conversion of the reflected light Lr into electrical signals, is of a mid signal level.

The mirror area Zm is constituted solely by the lands M, so that the light volume of the light Lr reflected thereby is abundant, such that the RF signal $S_{RF}$ after conversion into electrical signals is of a high level. The servo region Zs, above all, its region carrying the clock marks Mc, is set as usual so that the light volume of the light reflected thereby becomes least, so that the signal level of the RF signal after conversion of the reflected light Lr into electrical signals is of the low signal level.

In short, whether the recording pattern to be reproduced is that of the data region Zd, mirror area Zm or of the servo region Zs, above all, that of the clock marks Mc, can be easily discerned based upon the signal level of the RF signal produced on converting the reflected light Lr to the electrical signals.

If the recording pattern discerned as described above is that of the data region Zd, the information signals recorded in the data region Zd are reproduced based upon the push-pull signal Dpp calculated based upon the first and second output signals $S_1$ and $S_2$.

In this manner, the information signals recorded in the data region Zd of the optical disc 1 having the pit string of the pits P and the lands M on the inner periphery of the track center Tc and the inverted pit string of the pits P and the lands M inverted in array from those of the pit string are reproduced based upon the push-pull signals Dpp are reproduced. Consequently, the dc balance may be optimized, that is the digital sum value (DSV) may be reduced to zero spontaneously without the necessity of modulation for stabilizing the Dc balance, such as EFM. Since the recording data may be directly recorded as the pit information without modulation of the recording data, such as EFM, with consequent increase in data length, it becomes possible to realize a high recording data density.

Above all, the RF signal $D_{RF}$ is detected by detection by partial response PR (1, 1) and when the detection by PR (1, 1) is achieved by Viterbi decoding, it becomes possible to eliminate inter-symbol interference at the time of signal reproduction accompanying high density recording and to improve the S/N ratio of the playback signal.

The data region Zd of the above-described recording pattern may be discriminated based upon discrimination of the mid signal level of the RF signal SRF and the signal level of the push-pull signal Dpp not being zero, thereby enabling high speed accessing of the recording data.

In the present embodiment, the optical disc 1 has at least one clock mark Mc in the servo region Zs, that is a region in which the RF signal $S_{RF}$ is of a low level and the push-pull signal Dpp is zero, and the clock signal Sc is generated based upon detection of the clock mark Mc during reproduction of the optical disc 1, in order to render it possible to generate stable clock signals Sc and to reproduce the recording data satisfactorily.

On the other hand, the tracking error signal is generated by radiating the laser beam L on the optical disc 1, sampling RF signals $D_{RF}$ corresponding to the light volume of the reflected light Lr at servo pit positions for producing three-phase signals, finding the differences of the three-phase signals and by periodically switching and selecting the difference signals. In this manner, the beam spot BS may be captured quickly, accurately and stably with respect to the track center Tc during signal reproduction or track jump, thereby enabling reduction in the time since seek start until reproduction and enabling high-speed accessing of the recording data.

Figure 18:
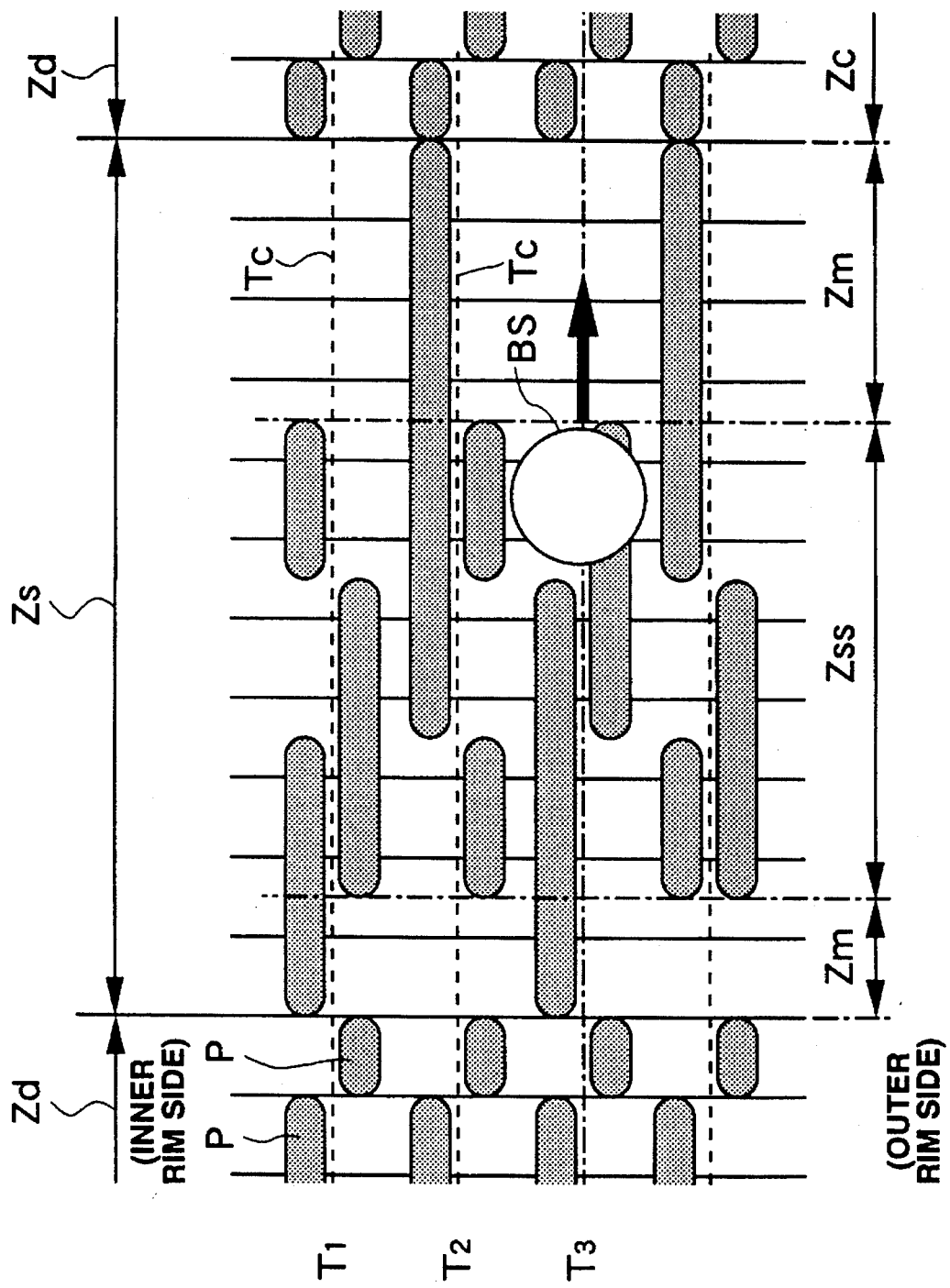
FIG. 18 is a schematic view showing essential portions of an optical disc according to a second embodiment, above all, another embodiment of a recording format in its servo region and its vicinity.

The optical disc 1 according to the second embodiment is explained by referring to FIG. 18, in which parts or components similar to those of FIG. 4 are correspondingly numbered and the description for these parts or components is not made for simplicity.

With the optical disc 1 of the present second embodiment, the mirror area Zm separating the servo area Zss in the servo region Zs from the data region Zd is alternately arrayed at the leading end or at the trailing end of the servo area Zs for every other track.

In this manner, the mirror area Zm is not consecutive in the radial direction of the optical disc 1, such that there is no danger of the molten resin flowing rapidly through the mirror area Zm towards the outer rim of the cavity during preparation of the optical disc 1. The result is that there is no risk of occurrence of "ghosts", that is fractured edge portions of the pit P in the servo region Zs of the completed optical disc 1.

In the previously described first embodiment, the mirror areas Zm are provided at the leading and trailing ends of the servo regions Zs, and two adjoining regions are distinguished by shifting the clock timing in these regions. In the present embodiment, there are pits formed in the mirror area Zm. However, since the data region Zd is not separated from the servo area Zss by a distance equal to an integer number of clocks and there is formed a mirror area in one of the pit strings, the data region may be distinguished from the servo area.

Figure 19:
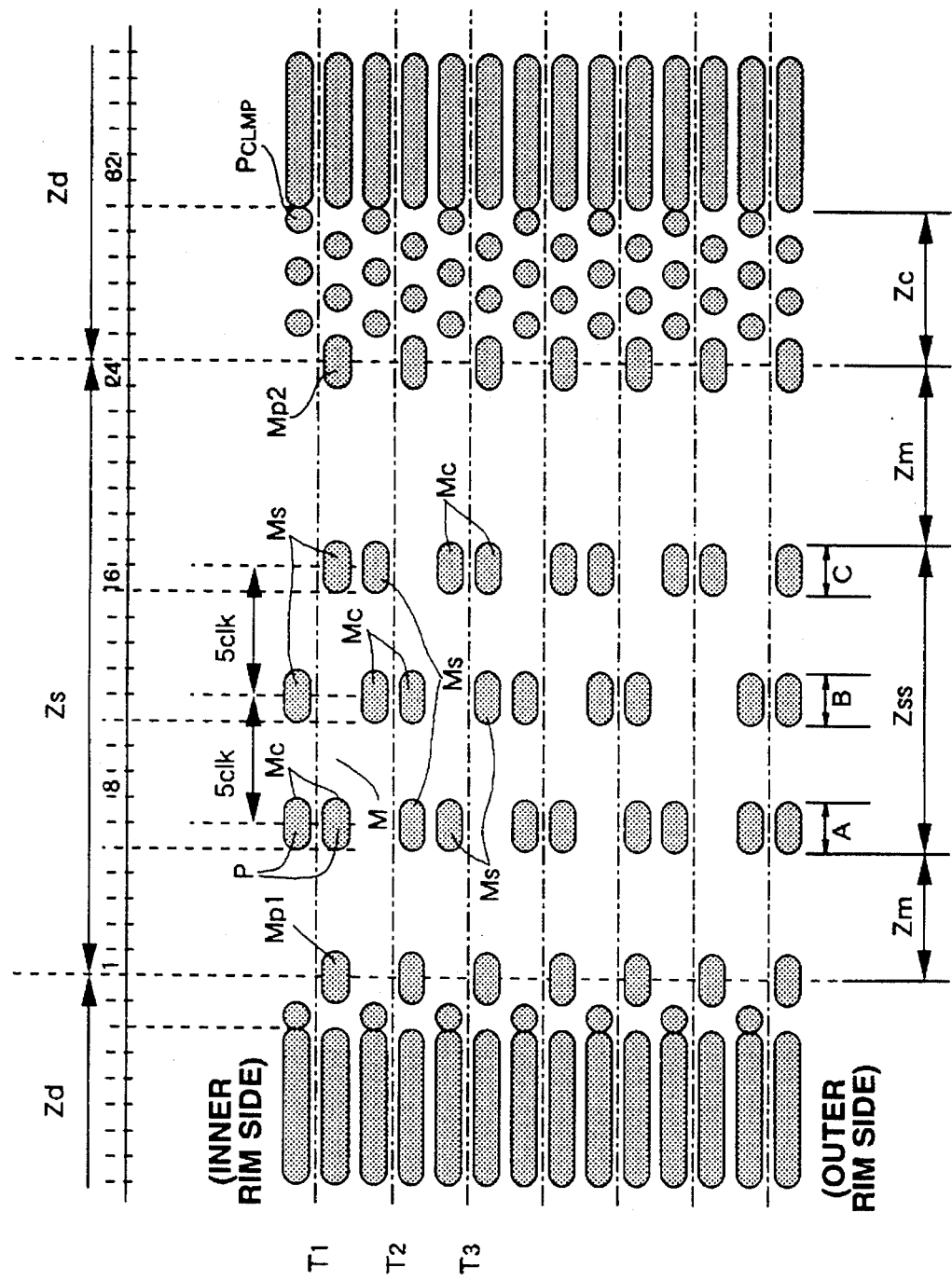
FIG. 19 is a schematic view showing essential portions of an optical disc according to a third embodiment, above all, still another embodiment of a recording format in its servo region and its vicinity.

Referring to FIG. 19, a third embodiment of the optical disc 1 is explained. Parts and components similar to those shown in FIG. 4 are correspondingly numbered and description of those parts or components is not made herein for simplicity.

The optical disc 1 of the third embodiment is similar to that of the first embodiment shown in FIG. 4, with the exception that polarity marks Mp1 and Mp2, each having a pit length equal to two clocks, are formed astride the boundary of the data region Zd and the mirror area Zm separating the servo area Zss in the servo region Zs from the data region Zd, and that the array pattern as described below is used as the arraying pattern of servo pits P making up the servo area Zss.

That is, the same arraying pattern of the servo pits P making up the servo area Zss is repeated at intervals of three tracks. Specifically, if a domain having a length of two clocks from the inchoate end of the servo area Zss is a region A, a domain having a length of two clocks from a position five clocks apart from the inchoate end of the region A is a region B and a domain having a length of two clocks from a position five clocks apart from the inchoate end of the region B is a region C, there are three patterns of pit array combinations included in each of these regions. Meanwhile, the regions A to C are separated from one another by mirror surface sections or lands M.

That is, in the illustrated embodiment, the inner and outer peripheral regions of the first track $T_1$ include pits P in the regions A and B and pits P in the regions A and C, respectively. In other words, the pits P are present in both the inner and the outer peripheral sides and each one pit P exists in the inner peripheral side in the B region and in the outer peripheral side in the region C. In the first track $T_1$, the pits P in the region A and the pits P in the regions B and C are used as clock marks Mc for clock detection and as servo marks Ms for tracking error detection, respectively.

Next, the inner and outer peripheral regions of the second track $T_2$ include pits P in the regions B and C and pits P in the regions A and B, respectively. In other words, the pits P are present in both the inner and the outer peripheral sides and each one pit P exists in the outer peripheral side in the region A and in the inner peripheral side in the region C. In the second track $T_2$, the pits P in the region B and the pits P in the regions A and C are used as clock marks Mc for clock detection and as servo marks Ms for tracking error detection, respectively.

Finally, the inner and outer peripheral regions of the third track $T_3$ include pits P in the regions A and C and pits P in the regions B and C, respectively. In other words, the pits P are present in both the inner and the outer peripheral sides in the region C and each one pit P exists in the inner peripheral side in the region A and in the outer peripheral side in the region B. In the third track $T_2$, the pits P in the region C and the pits P in the regions A and B are used as clock marks Mc for clock detection and as servo marks Ms for tracking error detection, respectively.

Of the polarity marks Mp, the leading polarity mark Mp1 is made up of two consecutive clocks, namely one clock at the trailing end of the data region Zd and one clock in the mirror area Zm, these two clocks lying astride the data region Zd and the mirror area Zm. On the other hand, the trailing polarity mark Mp2 is made up of two consecutive clocks, namely one clock at the leading end of the data region Zd and one clock in the mirror area Zm, these two clocks lying astride the boundary to the data region Zd and the mirror area Zm.

These leading and trailing polarity marks MP1 and MP2 are both formed on the outer peripheral side. When reproduced as the push-pull signal Dpp by the reproducing system shown in FIG. 8, the polarity marks are reproduced as the push-pulls signal having the (+) polarity. That is, the servo region Zs or the servo area Zss in the present third embodiment, when viewed from the push-pull signal Dpp, is equivalent to being sandwiched between the (+) polarity push-pull signals. As a result, the servo region Zs, and in particular the clock mark Mc can be detected easily by the pattern detection circuit 27, thereby expediting data accessing.

Figure 20:
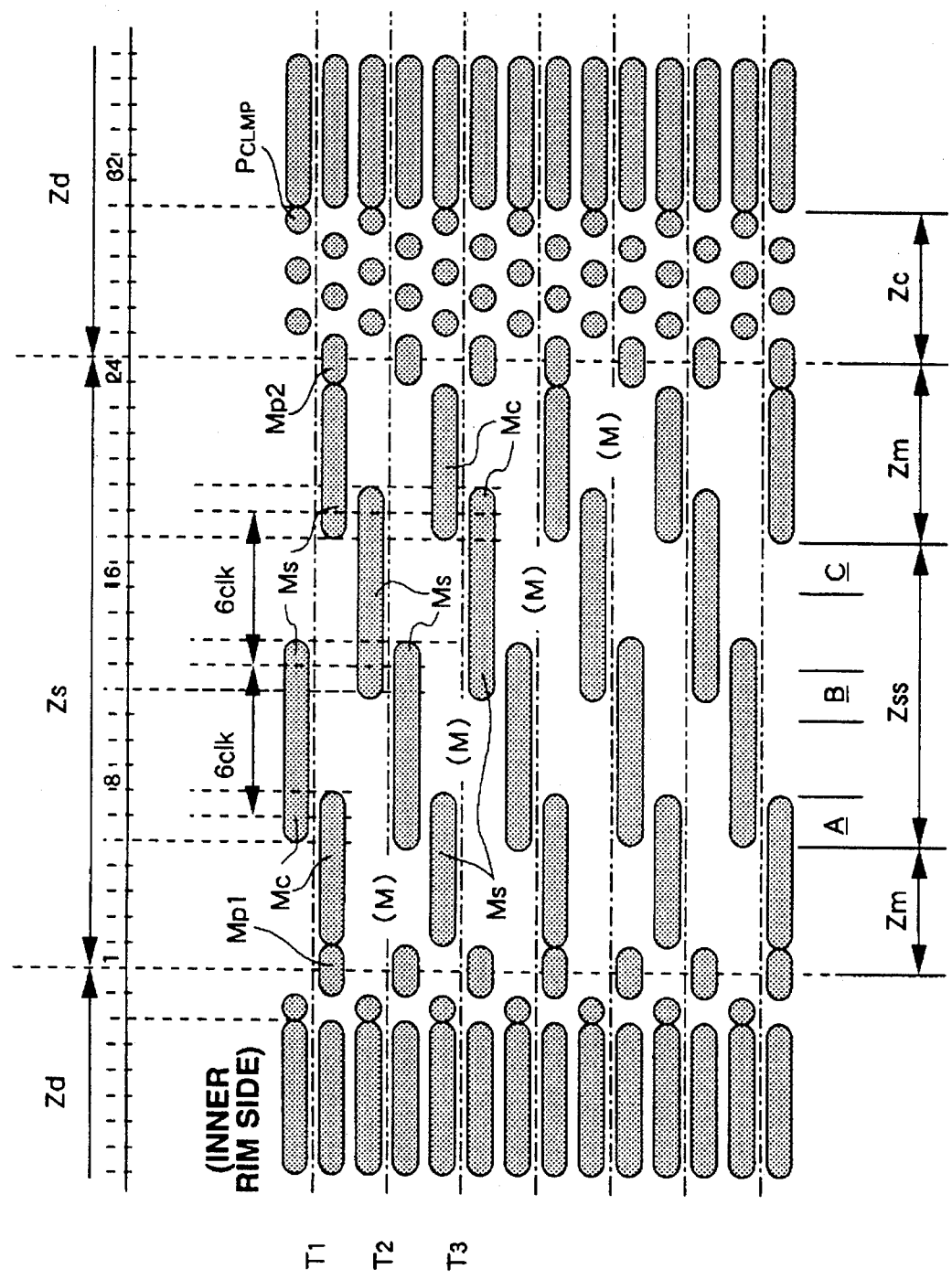
FIG. 20 is a schematic view showing essential portions of an optical disc according to a fourth embodiment, above all, a further embodiment of a recording format in its servo region and its vicinity.
Figure 21:
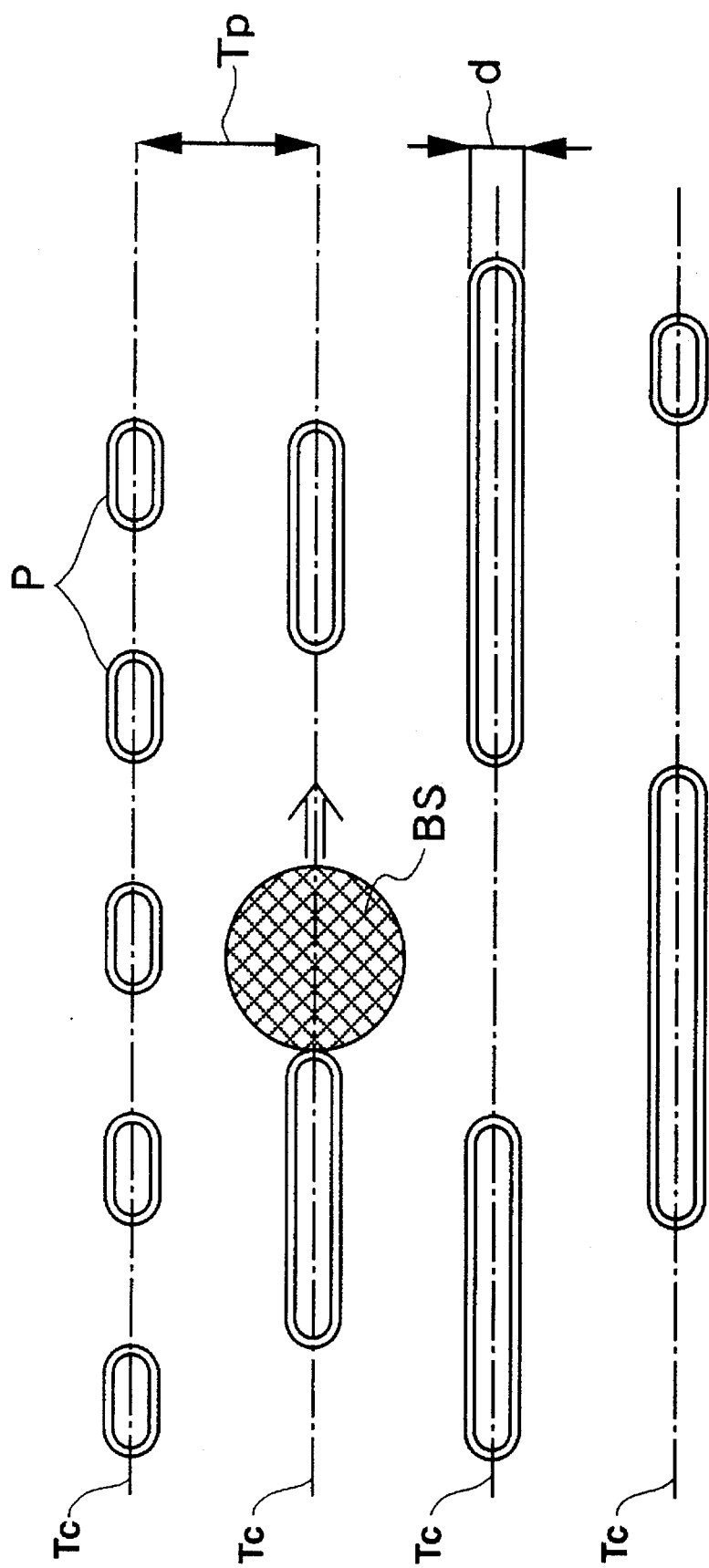
FIG. 21 is a schematic view showing a recording format of a conventional optical disc.
Figure 22:
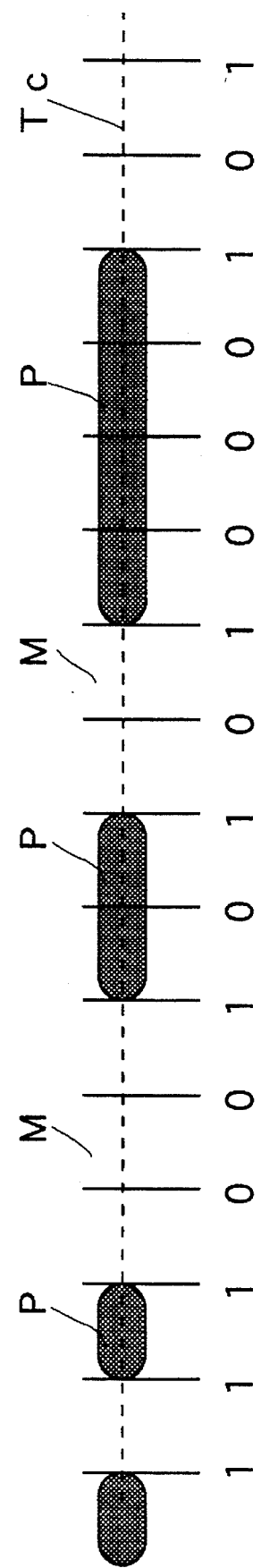
FIG. 22 is a schematic view showing the playback logic for the conventional optical disc.
Figure 23:
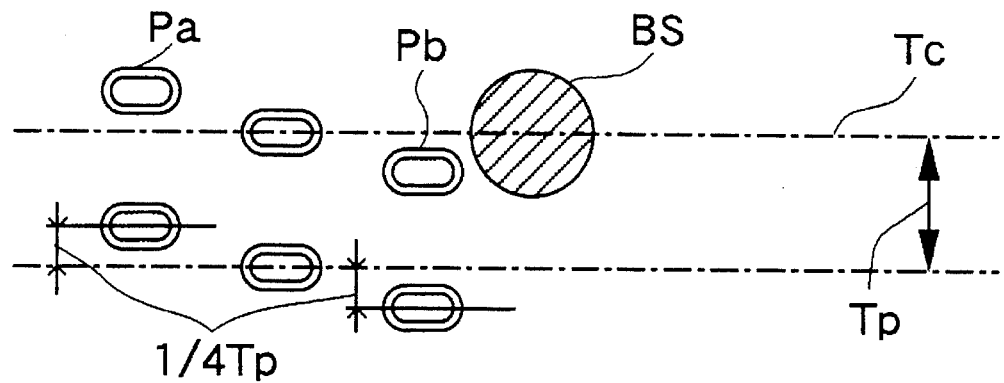
FIG. 23 is a schematic view showing the format for the servo pits of the conventional optical disc.

Referring to FIG. 20, a fourth embodiment of the optical disc 1 is explained. Parts and components similar to those shown in FIG. 19 are correspondingly numbered and description of those parts or components is not made herein for simplicity.

The optical disc 1 of the fourth embodiment is similar to that of the third embodiment shown in FIG. 19, with the exception that the following arraying pattern is used for the pits constituting the servo area Zss (servo pits).

That is, the same arraying pattern of the servo pits P making up the servo area Zss is repeated at intervals of three tracks. Specifically, if a domain having a length of two clocks from the inchoate end of the servo area Zss is a region A, a domain having a length of two clocks from a position six clocks apart from the inchoate end of the region A is a region B and a domain having a length of two clocks from a position six clocks apart from the inchoate end of the region B is a region C, there are three patterns of pit array combinations included in each of these regions.

That is, in the illustrated embodiment, pits P are formed in the inner peripheral side of the first track $T_1$, while pits P are formed in the outer peripheral side thereof, as from the trailing end of the leading polarity mark Mp1 as far as the region A, as traversing the mirror area Zm along the track direction. In addition, pits P are formed as from the region C up to the leading end of the Region A, as traversing the mirror area Zm along the track direction. In short, the pits P are present in both the inner and the outer peripheral sides and one pit P exists in the inner peripheral side in the B region and in the outer peripheral side and another pit P exists in the region C. In the first track $T_1$, the pits P in the region A and the pits P in the regions B and C are used as clock marks Mc for clock detection and as servo marks Ms for tracking error detection, respectively.

In the inner and outer peripheral sides of the second track $T_2$, there are formed pits from the region B across the region C and from the region A through the region B, respectively. In short, the pits P are present in both the inner and the outer peripheral sides of the region B and one pit P exists in the outer peripheral side in the A region and another pit P exists in the inner peripheral side in the region C. In the second track $T_2$, the pits P in the region B and the pits P in the regions A and C are used as clock marks Mc for clock detection and as servo marks Ms for tracking error detection, respectively.

In the inner peripheral side of the third track $T_3$, there are formed pits P from a position corresponding to the trailing end of the leaching polarity mark Mp1 through the region A and from the region C to a position corresponding to the leading end of the trailing end polarity mark Mp2, while a pit P is formed from the region C through the region C. In short, the pits P are present in both the inner and the outer peripheral sides of the region C and one pit P exists in the inner peripheral side in the A region and another pit P exists in the outer peripheral side in the region B. In the third track $T_3$, the pits P in the region C and the pits P in the regions A and B are used as clock marks Mc for clock detection and as servo marks Ms for tracking error detection, respectively.

Turning to the servo region Zs of the optical disc 1 according to the present fourth embodiment, a region thereof presenting the lands in both the inner and outer peripheral sides of a given track, such as the second track $T_2$, indicated as (M) in FIG. 20, is spaced apart from the clock mark Mc by a distance as measured from the trailing end of the region (M) as far as the leading end of the clock mark Mc, equal to six clocks. Besides, the region (M) of a given track is spaced apart from the region (M) of adjacent tracks by a distance as measured between the trailing end of the land of such given track, such as the second track $T_2$, and the leading end of the land of an adjacent track, such as the third track $T_3$, equal to two tracks.

In the optical disc of the fourth embodiment, since the leading and trailing end polarity marks are formed in the same manner as in the optical disc of the third embodiment, the servo region, in particular the clock marks, can be detected easily by the unique pattern detection circuit, thereby enabling expedited data accessing.

In distinction from the third embodiment, pits P are continuously formed in the first track T1 and in the third track T3 for traversing the land along the track direction. Besides, in the third embodiment, since pits are formed for traversing the lands present between the regions A and B and between the regions B and C, there is no possibility for the mirror area Zm and the mirror surface to be formed continuously along the radius of the optical disc 1 and hence there is no possibility for the molten resin to flow quickly through the mirror area Zm and through the mirror surface towards the outer rim of the cavity during fabrication of the optical disc 1. The result is that there is no risk of occurrence of so-called ghosts, that is fractured edges of the pits P in the servo region Zs of the completed optical disc 1.

Although the present invention is applied in the above-described embodiments to the replay-only optical disc 1, the present invention may also be applied to a magneto-optical disc in which the pit string information is formed on the segment basis and the information is read out by reproduction under the Kerr effect.

What is claimed is:

1. A reproducing apparatus for reproducing an information signal recorded on an optical recording medium having a first pit string having a succession of pits and mirror surface sections, the first pit string being formed on one side of a track center as a reference, and a second pit string formed on an opposite side of the track center and having pits and mirror sections in an array which is the logical inverse of the pits and the mirror surface sections of the first pit string, wherein a laser beam radiated onto the track center is used to access information signals represented by the pits and the mirror surface sections, said reproducing apparatus comprising:

an optical pickup for radiating a laser beam having a spot diameter astride said first and second pit strings onto said track center and outputting a detection signal based on the volume of the reflected light, means for calculating a push-pull signal based upon the detection signal from said optical pickup, and reproducing means for reproducing said information signal based upon polarity inversion of said push-pull signal from said calculating means.

2. A reproducing apparatus for reproducing an information signal recorded on an optical recording medium having a sampled servo system recording format having a data region for recording information signals and a servo region having a servo area for recording servo data, in which the data are accessed depending on pre-set clock signals, wherein a first pit string and a second pit string each formed by a succession of pits and mirror surface sections are formed on one and the other sides of a track center, respectively, as a reference, so that a laser beam radiated onto the track center is used to access information signals represented by the pits and the mirror surface sections, and wherein only in the data region are the pits and mirror surface sections of the first string the logical inverse of the pits and mirror surface sections of the second pit strings, said reproducing apparatus comprising:

an optical pickup for radiating a laser beam having a spot diameter astride said first and second pit strings onto said track center and outputting a detection signal based on the volume of the reflected light, means for calculating a push-pull signal based upon the detection signal from said optical pickup, and reproducing means for reproducing said information signal recorded on said data region based upon polarity inversion of said push-pull signal from said calculating means.

3. The reproducing apparatus as claimed in claim 2 wherein:

said servo area and the data region of the optical recording medium are separated from each other by a mirror area formed in the servo area only by said mirror surface section, and wherein said reproducing means separates the signal reproduced from the servo area and the signal reproduced from the data region by detecting said mirror area.

4. The reproducing apparatus as claimed in claim 2 wherein:

the pits formed in said servo area of the optical recording medium are dephased by being offset by one-half the clock pitch with respect to the pits formed in said data region, and wherein said reproducing means separates the signal reproduced from the servo area and the signal reproduced from the data region by detecting said dephasing.

5. The reproducing apparatus as claimed in claim 2 wherein:

both the first pit string and the second pit string are formed in the servo area, and the servo area includes a clock mark for detecting the clock signals and a servo mark for producing the tracking information, one of the first and second pit strings of the servo mark being formed as pits and the other of the first and second pit strings being formed as a mirror surface section, and wherein said reproducing means generate the clock signals based upon the results of detection of said clock mark.

6. The reproducing apparatus as claimed in claim 3 wherein:

said reproducing means determine, based upon the polarity of said push-pull signal and the signal level of said detection signal, from which of the servo area, mirror area and the data region the reproduced signals have been derived.

7. The reproducing apparatus as claimed in claim 3 wherein:

both the first pit string and the second pit string are formed in the servo area, and the servo area includes a clock mark for detecting the clock signals and a servo mark for producing the tracking information, one of the first and second pit strings of the servo mark being formed as pits and the other of the first and second pit strings being formed as a mirror surface section, and wherein said reproducing means generate the clock signals based upon the results of detection of said clock mark.

8. The reproducing apparatus as claimed in claim 7 wherein:

said reproducing means determine, based upon the polarity of said push-pull signal and the signal level of said detection signal, from which of the servo area, mirror area and the data region the reproduced signals have been derived.

9. The reproducing apparatus as claimed in claim 8 wherein:

said reproducing means determine the signal level of the detection signal based upon a three-level logic of high, mid and low levels.

* * * * *